(12) United States Patent
Yang et al.

(10) Patent No.: US 7,289,942 B2
(45) Date of Patent: Oct. 30, 2007

(54) PERFORMANCE PREDICTION METHOD FOR HYDROCARBON RECOVERY PROCESSES

(75) Inventors: Shan H. Yang, Houston, TX (US); John W. Miertschin, Houston, TX (US); Ryan A. Kudva, Pearland, TX (US); Sepehr Arbabi, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 121 days.

(21) Appl. No.: 10/545,730

(22) PCT Filed: Mar. 16, 2004

(86) PCT No.: PCT/US2004/007999

§ 371 (c)(1),
(2), (4) Date: Aug. 15, 2005

(87) PCT Pub. No.: WO2004/095259

PCT Pub. Date: Nov. 4, 2004

(65) Prior Publication Data

US 2006/0224369 A1    Oct. 5, 2006

Related U.S. Application Data

(60) Provisional application No. 60/457,718, filed on Mar. 26, 2003.

(51) Int. Cl.
*G06G 7/48* (2006.01)

(52) U.S. Cl. .............................. 703/10; 166/305.1

(58) Field of Classification Search .................. 703/10; 166/245, 261, 401, 270, 305.1; 702/12; 73/152.06, 73/152.18, 152.39; 507/100
See application file for complete search history.

(56) References Cited

U.S. PATENT DOCUMENTS 5,174,377 A    12/1992 Kumar ...................... 166/245

(Continued)

FOREIGN PATENT DOCUMENTS

WO    WO 00/32905    6/2000

(Continued)

OTHER PUBLICATIONS

Nikravesh et al., "Dividing Oil Fields into Regions with Similar Characteristic Behavior Using Neural Network and Fuzzy Logic Approaches", Biennial Conference of the North American Fuzzy Information Processing Society, Jun. 1996, pp. 164-169.

(Continued)

*Primary Examiner*—Leo Picard
*Assistant Examiner*—Calos Ortiz-Rodriguez

(57) ABSTRACT

The invention relates to a method for predicting the performance of large-scale hydrocarbon-bearing reservoir floods. One embodiment of the invention includes a method for predicting performance of a patterned flooding process in a subterranean hydrocarbon-bearing formation, said formation being penetrated by a plurality of injector wells and producer wells, comprising the steps of: determining flow-based pairs of injector to producer wells [FIG. 4, item 78a] (first well pairs) using a geological model [item 76]; developing a connective pore volume distribution curve for each first well pair item [78b]; selecting at least two first well pairs (selected well pairs) that reflect narrow and wide connective pore volume distributions that correspond to high and lower oil recovery levels; developing a 3-D simulation model for each selected well pair, performing a reservoir simulation for each selected well pair for the corresponding flooding process; and generating prototype performance curves for each selected well pair. An alternate embodiment of the invention includes a method for predicting the performance of large-scale hydrocarbon-bearing reservoir floods where injection well location, production well location, a process parameter, or a well processing rate is modified.

32 Claims, 9 Drawing Sheets

U.S. PATENT DOCUMENTS

| | | | |
|---|---|---|---|
| 5,710,726 A | 1/1998 | Rowney et al. | 364/578 |
| 5,784,538 A * | 7/1998 | Dzyacky | 706/45 |
| 5,881,811 A | 3/1999 | Lessi et al. | 166/245 |
| 6,236,984 B1 | 5/2001 | Owens et al. | 700/28 |
| 6,519,531 B1 * | 2/2003 | Batycky et al. | 702/12 |
| 6,668,922 B2 * | 12/2003 | Ziauddin et al. | 166/250.05 |
| 6,987,386 B1 * | 1/2006 | Vail, III | 324/368 |
| 7,059,180 B2 * | 6/2006 | Al-Ghamdi | 73/152.42 |

FOREIGN PATENT DOCUMENTS

| | | |
|---|---|---|
| WO | WO 01/27755 A1 | 4/2001 |
| WO | WO 02/18747 A1 | 3/2002 |

OTHER PUBLICATIONS

Liu et al., "Underground Ultrasound Probing for Monitoring Carbon Dioxide Flooding-in Oil Producing Reservoirs", Canadian Conference on Electrical and Computer Engineering, May 2002, pp. 510-514.

Kostyuchenko et al., "Application of Neural Network Technology for Modeling Well Operation and Fluid Filtration Processes in Oil Reservoirs", The Third Russian International Symposium on Science and Technology, KORUS '99, Jun. 1999, pp. 297-299.

D.L., Gallup, "Combination Flash-Bottoming Cycle Geothermal Power Generation: A Case History", Proceedings of the 31st Intersociety Energy Conversion Engineering Conference, Aug. 1996, pp. 1622-1627.

A. Albertoni and L.W. Lake, "Inferring Interwell Connectivity Only from Well-Rate Fluctuations in Waterfloods", Society of Petroleum Engineers, SPE No. 83381, Apr. 2002, pp. 6-11.

Lolomari et al., "The Use of Streamline Simulation in Reservoir Management: Methodology and Case Studies", Society of Petroleum Engineers, SPE No. 63157, Oct. 2000, pp. 1-13.

Samier et al., "Applications of Streamline Simulations to Reservoir Studies", Society of Petroleum Engineers, SPE No. 66362, Feb. 2001, pp. 1-13.

Giordano et al, "A New Approach to Forecasting Miscible WAG Performance at the Field Scale", Society of Petroleum Engineers, SPE No. 36712, Oct. 1996, pp. 329-341.

G.H. Grinestaff and D.J. Caffrey, "Waterflood Management: A Case Study of the Northwest Fault Block Area of Prudhoe Bay, Alaska, Using Streamline Simulation and Traditional Waterflood Analysis", SPE No. 63152, Oct. 2000, pp. 1-7.

Ali et al., "Tracer Simulation to Improve the Reservoir Model in the Snorre Field", Society of Petroleum Engineers, SPE No. 64796, Nov. 2000, pp. 1-7.

Ruan et al., "An Overview of Streamline Tracer Modeling of Miscible/Immiscible WAG Injection IOR", Society of Petroleum Engineers, SPE No. 75198, Apr. 2002, pp. 1-9.

Lui et al., "A New Particle Tracking Algorithm for Tracer Flow Simulation", Society of Petroleum Engineers, SPE No. 51905, Feb. 1999, pp. 1-8.

E.C. Shaw, "A Simple Technique to Forecast $CO_2$ Flood Performance", Society of Petroleum Engineers, SPE No. 23975, Mar. 1992, pp. 359-370.

J.S. Wingard and R.S. Redman, "A Full-Field Forecasting Tool for the Combined Water/Miscible Gas Flood at Prudhoe Bay", Society of Petroleum Engineers, SPE No. 28632, Sep. 1994, pp. 271-286.

S. Rester and M.R. Todd, "An Automated Method for Predicting Full-Scale $CO_2$ Flood Performance Based on Detailed Pattern Flood Simulations", Society of Petroleum Engineers/U.S. Department of Energy, SPE/DOE No. 12663, Apr. 1984, pp. 327-333.

Blunt et al., "A Genralized Streamline Method to Predict Reservoir Flow", Petroleum Geoscience, vol. 2, 1996, pp. 259-269.

Okazawa et al., "Analytical Software for Pool-wide Performance Prediction of EOR Processes", The Journal of Canadian Petroleum Technology, V. 34, No. 4, Apr. 1995, pp. 41-49.

European Search Report RD 110218 for U.S. Appl. No. 60/457,718, mailed Oct. 3, 2003, 3 pages.

International Search Report and Written Opinion for PCT/US04/07999 (2003UR012), mailed Sep. 10, 2004, 7 pages.

PCT Preliminary Report on Patentability, mailed Oct. 13, 2005, for International Application No. PCT/US04/07999 (2003UR012), 5 pages.

Ep Search Report dated Jun. 27, 2006 (2 pages).

Yang, D. (2003) "Intergrated Global Optimization of Displacement Efficiency in Hydrocarbon Reservoirs," *SPE* 81035, SPE Latin American and Caribbean Petroleum Engineering Conf., Port-of-Spain, Trinidad, West Indies, Apr. 27-30, 2003, (11 pp.).

* cited by examiner

PERFORMANCE PREDICTION METHOD FOR HYDROCARBON RECOVERY PROCESSES

CROSS REFERENCE TO RELATED APPLICATIONS

This application claims the benefit of U.S. Provisional Application 60/457,718, filed Mar. 26, 2003.

FIELD OF THE INVENTION

The invention relates generally to a method for predicting the performance of large-scale hydrocarbon-bearing reservoir floods.

BACKGROUND

Performance prediction plays an important role in the management of large-scale waterfloods and miscible gasfloods. Computer simulation methods/tools are used to predict the ultimate recovery of hydrocarbons in the design of a flooding process and optimization of flooding operations. Typically, a large number of injectors and producers are aligned in patterns in a patterned flood. The operation of such a patterned flood can be complex, because fluid flows from injectors to producers in the reservoir are complex and interacting. Displacement performance within a given pattern is often influenced by the injection activities and production activities of surrounding flood patterns. To achieve optimal oil production, some wells may be injecting or producing at their maximum rates. Yet other wells may be shut in or choked back in a given period, and the flow rates into injectors and from producers may change from time to time. In addition, for EOR processes such as miscible gasfloods the allocation of expensive miscible solvent among injectors is not straightforward.

It is highly desirable to assess quickly and accurately the flooding performance of a hydrocarbon-bearing reservoir during the operation of large-scale, pattern waterfloods or enhanced oil recovery (EOR) projects such as miscible gasfloods. Many different techniques have been proposed for predicting performance of pattern floods. Here, the four most common methods are referred to as:

3-D, 3-phase finite-difference simulation,
3-D, 3-phase streamline simulation,
Conventional production type-curve scale-up methods,
Streamline-based forecasting methods.

These four methods are briefly described below.

3-D, 3-phase finite-difference simulation: The 3-D, 3-phase finite-difference reservoir simulation method models the full physics (e.g. reservoir geology, multi-phase flow and phase interactions) of multi-phase flow in a hydrocarbon-bearing reservoir that is represented by a 3-D geological model. The principle is to solve equations describing physical phenomena by a computer. The reservoir system is divided into small gridcells or blocks with each characterized by sets of variables such as porosity and permeability. The physical displacement system is described by a set of algebraic equations to express the fundamental principles of conservation of mass, energy, and momentum within each gridcell and transfer of mass, energy, and momentum between gridcells. This time-dependent transport of gas, oil, and water phases is modeled in a sequence of timesteps. The computation is especially complicated for EOR processes such as miscible gas flooding that requires multiple components to characterize the oil and gas phases.

Finite-difference simulation of pattern waterfloods and EOR processes typically require a large number of gridcells and small timesteps. A large reservoir with hundreds of thousands of grid blocks, hundreds of wells, and an extensive production history requires substantial computing resources. A single field simulation run can take several days to several weeks to complete. For large pattern floods, finite-difference simulation is often conducted using small models representing only a segment of the field or an element of a typical pattern. The element-model simulation is used to study flood mechanisms and generate production type-curves for full-field performance prediction. Full-field, 3-D, 3-phase, finite difference simulation can be used for detailed reservoir studies. Due to its lengthy computation, it is often not used for making operating decisions in day-to-day management of large pattern floods, especially for EOR processes.

3-D, 3-phase streamline simulation: The 3-D, 3-phase streamline simulation method models most of the flow physics in a 3-D geological model. It determines 3-D, single-phase flow streamlines, followed by calculating multi-phase fluid saturations along these streamlines. The underlying principle is to decouple the governing equations of fluid motion from a 3-D problem to multiple 1-D problems solved along streamlines. Streamline simulation can be used to simulate the performance of large pattern waterfloods and miscible gasfloods. In modeling large-scale waterflooding operations, it can be several times faster than 3-D, 3-phase finite-difference simulation. Examples of this method are disclosed in (a) Grinestaff, G. H. and Caffrey, Daniel J., Waterflood Management: *A Case Study of the Northwest Fault Block Area of Prudhoe Bay, Ak., Using Streamline Simulation and Traditional Waterflood Analysis*, SPE 63152, presented at the 2000 SPE Annual Technical Conference and Exhibition held in Dallas, Tex., October 2000 and (b) Lolomari, T., Bratvedt, K., Crane, M., Milliken, W. J., Tyrie, J. J., *The Use of Streamline Simulation in Reservoir Management: Methodology* and Case Studies SPE 63157, presented at the 2000 SPE Annual Technical Conference and Exhibition held in Dallas, Tex., October 2000.

3-D, 3-phase streamline simulation of miscible gas flooding is significantly slower than that of waterflooding, because multiple components are involved in developing miscibility between the oil and injected miscible solvent. The slower computation limits the application of compositional streamline simulation for managing large-scale pattern miscible gasfloods.

Conventional type-curve scale-up: Conventional production type-curve scale-up methods are simple, quick, and rough. They typically involve the following steps. (1) Divide the reservoir into geometric injector-producer polygons, each confining fluid flow between an injector-producer pair. (2) Allocate injection throughput for each polygon using a geometric technique. (3) Calculate oil, gas, and water production from each polygon using the injection throughput and production type curves. (4) Sum production from the polygons connecting to each producer to obtain production rates from individual producers.

Conventional production type-curve scale-up is the most frequently used approach to predict flood performance for large pattern floods. However, it is oversimplified due to the use of geometric injector-producer polygons and geometric fluid allocations. Consequently, its predictive capability is highly limited.

Various ways have been proposed for choosing geometric injector-producer polygons; various dimensionless correlation equations have been proposed for expressing production type-curves. One example was given in a paper by Shaw, E. C., "A Simple Technique to Forecast $CO_2$ Flood Performance," SPE 23975, presented at the 1992 SPE Permian Basin Oil and Gas Recovery Conference held in Midland, Tex., March 1992. The Shaw method expresses production type-curves in simple correlation equations. Additionally, it uses geometric patterns, instead of geometric injector-producer polygons, as flow units and scales up one set of production type-curves to the entire field. Due to the limited fluid and reservoir properties built into the method, most of the model properties, such as fluid allocation, pattern pore volume, oil saturation, and reservoir heterogeneity, become tuning parameters in matching predictions with actual production.

A more complicated scale-up method was proposed for forecasting performance of a combined waterflood and miscible gasflood (see Wingard, J. S. and Redman, R. S., A Full-Field Forecasting Tool for the Combined Water/Miscible Gas Flood at Prudhoe Bay, SPE 28632, presented at the SPE 69th Annual Technical Conference and Exhibition held in New Orleans, La., September 1994). The Wingard et al. method uses a separate streamline program as a guide in choosing the geometric injector-producer polygons and associated fluid allocations. While this method is more accurate than those based strictly on geometric fluid allocation, it cannot respond to dynamic changes of well locations and rates. The Wingard et al. method expresses oil production type-curves in correlation equations for recovery due to a base waterflood and enhanced recovery due to miscible solvent injection.

The conventional production type-curve scale-up methods of the prior art provide less than desirable results for two reasons. First, the use of geometric polygons results in erroneous fluid allocations and poor predictive capabilities. Second, the use of fixed geometric polygons do not handle dynamic changes to well rates and locations.

Streamline-based forecasting: Streamline-based forecasting methods allocate fluids based on flow streamlines and use production type-curves formulated in various forms. Such methods were designed for better accuracy than the conventional production type-curve scale-up methods and for faster computation speed than the finite-difference and streamline simulation methods. Examples are disclosed in the following papers: (1) Emanuel, A. S., Alameda, G. K., Bohrens, R. A., Hewett, T. A., Reservoir Performance Prediction Methods Based on Fractal Geostatistics, SPE Reservoir Engineering, 311, August (1989) and (2) Giordano, R. M., Redman, R. S., Bratvedt, F., A New Approach to Forecasting Miscible WAG Performance at the Field Scale, SPE 36712, presented at the 1996 SPE Annual Technical Conference and Exhibition held in Denver, Colo., October 1996.

The Emanuel method generates field-wide 2-D streamtubes and uses production type-curves in the form of oil, gas, and water fractional flows for each stream tube. Typical fractional flows are generated from finite-difference, 3-phase, 2-D cross-sectional simulation. These fraction flow curves account for displacement efficiency and vertical reservoir heterogeneity, while field-wide 2D stream-tubes accounted for areal reservoir heterogeneity. The Emanuel method provides more accurate fluid allocation than the conventional scale-up methods. However, it cannot handle changes to well rates, locations, and key process parameters such as solvent bank size.

The Giordano et al. method uses streamlines and tracer adsorption/desorption for forecasting the field-wide performance of miscible gasfloods. The performance of a miscible flood is divided into base waterflooding and enhanced oil recovery due to miscible gas injection. The performance of the base waterflood is calculated by 3-D, 3-phase streamline simulation as discussed above, while the performance of the enhanced recovery is calculated by a tracer adsorption-desorption scheme. The scheme involves generation of 2-D streamlines followed by estimation of fluid saturation along streamlines via prototype production that is formulated in tracer adsorption-desorption equations, coefficients, and inaccessible pore volumes. The tracer adsorption-desorption coefficients and inaccessible pore volumes are extracted by fitting the tracer adsorption-desorption equations with prototype production obtained from 3-D, 3-phase, element-model, finite-difference simulation. This method provides good fluid allocations and handles well changes. However, the expression of prototype production through the tracer adsorption and desorption formulation limits the flexibility of handling key process parameters, such as WAG, VGR and well flow rates.

A need exists for a computationally fast, sufficiently accurate, operationally flexible method for predicting the performance of large-scale pattern floods such as waterfloods and miscible gasfloods. The method should preferably handle changes to well flow rates, locations, and key process parameters such as WAG ratio, VGR and solvent bank size for field operations.

SUMMARY OF THE INVENTION

The first embodiment of the invention includes a method for predicting performance of a patterned flooding process in a subterranean hydrocarbon-bearing formation, the formation being penetrated by a plurality of injector wells and producer wells, comprising the steps of: determining flow-based pairs of injector to producer wells (first well pairs) using a geological model; developing a connective pore volume distribution curve for each first well pair; selecting at least two first well pairs (selected well pairs) that reflect narrow and wide connective pore volume distributions that correspond to high and lower oil recovery levels; developing a 3-D simulation model for each selected well pair; performing a reservoir simulation for each selected well pair for the corresponding flooding process; and generating prototype performance curves for each selected well pair.

A second embodiment of the invention includes a method for predicting performance of a patterned flooding process in a subterranean hydrocarbon-bearing formation, said formation being penetrated by a plurality of injector wells and producer wells, comprising the steps of: generating type-curve correlation equations for two or more well types; providing a single-phase, 2-D model of at least a portion of the subterranean formation; initializing said single-phase, 2-D model for initial pressure and initial oil saturation at the start of the patterned flooding process; determining flow-based pairs of injector to producer wells (second well pairs) using said single-phase, 2-D model of at least a portion of the hydrocarbon-bearing formation; determining for each second well pair a second processing rate and second pore volume; assigning to each second well pair one set of said type-curve correlation equations; calculating second cumulative injection for each second well pair using said second well pair's second processing rate and second pore volume; calculating second cumulative fluid production for each said second well pair from said second well pair's assigned type-curve correlation equations; estimating a second oil saturation in the single phase, 2-D model grid cells based on a tracer simulation representative of the formation before a modification; modifying injection well location, production well location, a process parameter, or a well processing rate; re-determining flow-based pairs of injector to producer wells (third well pairs) using said single phase, 2-D model of at least a portion of the hydrocarbon-bearing formation and re-calculating for each third well pair a third processing rate and third pore volume; calculating a new starting point on the type-curve correlation equations using the initial oil saturation and the second oil saturation; and using said third processing rate, said third pore volume, and said type-curve correlation equations to predict fluid production for each said third well pair for predetermined time intervals.

BRIEF DESCRIPTION OF THE DRAWINGS

FIG. 8 also shows three element models, each with 2 or 3 injector-producer pairs, selected for prototype performance curve generation.

FIG. 10 also shows a good fit between type-curve correlation equations and 3-D, 3-phase finite-difference simulation results obtained for one injector-producer well pair.

DETAILED DESCRIPTION

The following description and claims make use of mathematical symbols, many of which are defined as they occur in this description. Additionally, for purposes of completeness, a table containing definitions of symbols used herein is presented following the detailed descriptions. Before proceeding, definitions of principal terms used in the description and claims are provided to aid the reader in understanding the invention.

CPVD is an acronym for connected pore volume distribution that is further detailed in the section on selection of representative well pairs.

Element model means a small flow model that represents a fraction of a flood pattern and contains at least one injector-producer pair.

Figure 1:
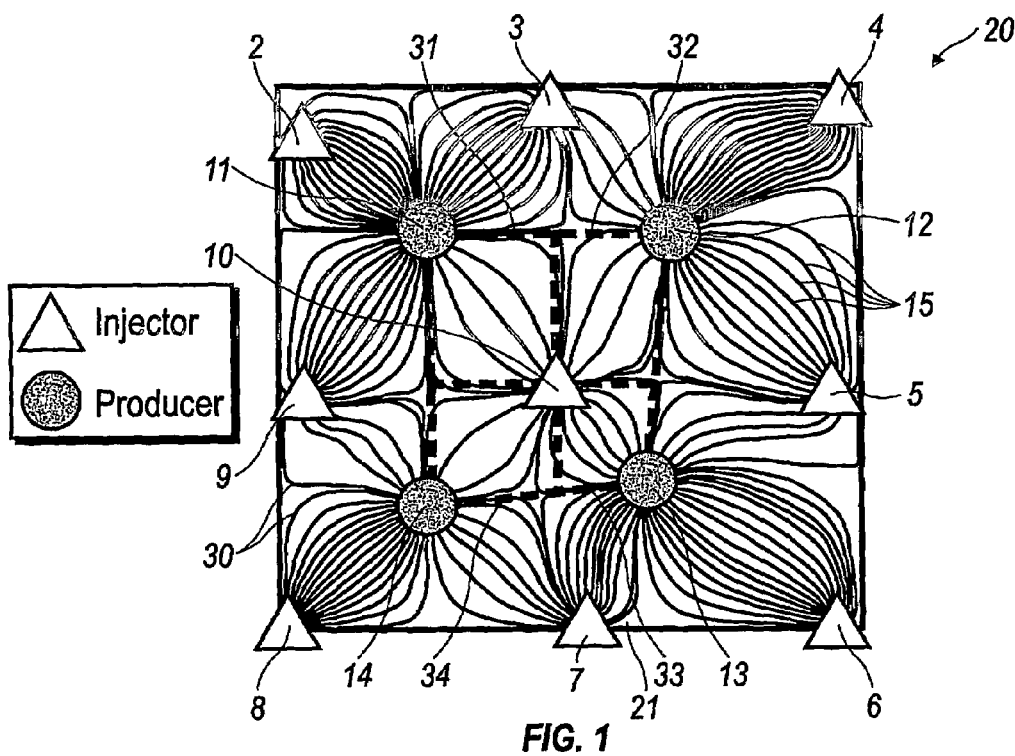
FIG. 1 illustrates the top view of patterned injector and producer wells penetrating a section of a hydrocarbon-bearing reservoir and 2-D streamlines disposed between the injector and producer wells.

Flow-based injector-producer pair is defined as an injector and producer well pair connected by flow streamlines. For example, FIG. 1 illustrates an example of 16 injector-producer pairs. In FIG. 1 fluid allocations from the center injector to the four surrounding flow-based injector-producer pairs are 35%, 19%, 34%, and 12%, oriented clockwise from the northwest direction. Such a fluid allocation differs significantly from equal allocations (25%) based on angles of geometric injector-producer polygons as used in some of the methods described in the background section.

Geometric injector-producer polygon is a geometric polygon that bounds fluid flow within an injector and producer pair. For example, the center of FIG. 1 illustrates a 5-spot pattern with one injector and four producers and four geometric injector-producer polygons depicted with bold dashed lines. Using the simplistic geometric technique of the prior art, 25% of the fluid injected into injector (10) is allocated to each of the four polygons without any simulation of the geological conditions.

Injection throughput means the cumulative amount of fluid injected (i.e. injectant), including, for example, water, steam, polymer, and/or gas in a flooding operation.

Injector or injection well is a well in which a fluid, such as water, steam, polymer, and/or gas, is injected to provide supplemental energy to drive oil from the reservoir to the vicinity of one or more producers.

Pore volume is the volume of reservoir pore space available for fluid flow. For an injector-producer pair, its pore volume is the space within no-flow boundaries slicing vertically through the reservoir thickness.

Processing rate means the total rate of all fluids, water, oil, and/or gas, in terms of reservoir barrels per day.

Producer or production well is a well from which reservoir fluids, such as oil, gas, and water are withdrawn from the reservoir.

Figure 2:
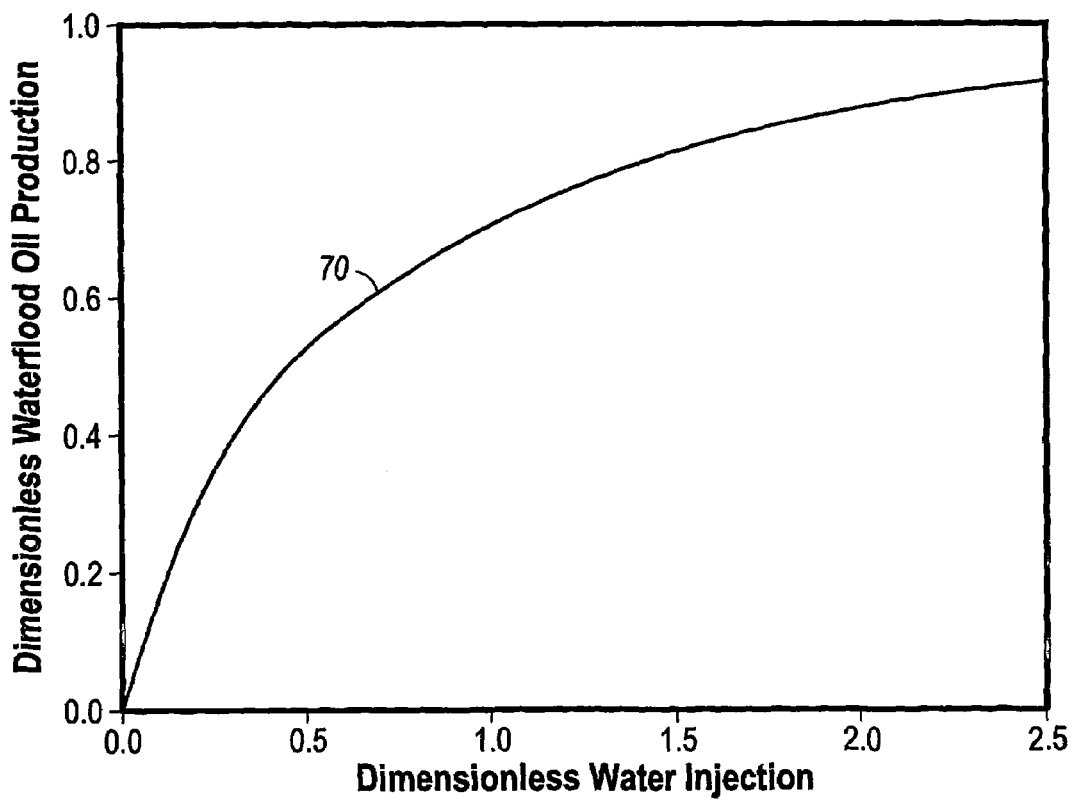
FIG. 2 illustrates an oil prototype performance curve for a water flood that is expressed as dimensionless cumulative oil production versus dimensionless water injection.

Production type-curve means a curve representing the relationship of fluid production to injectant fluid injection. Such curves may be generated through techniques know in the art and the methods discussed herein. One method of generating production type-curves includes, for example, from 3-D, 3-phase finite difference flow simulation in a small section of the reservoir containing an injector-producer pair. Production type-curves may be expressed in a dimensionless format such as cumulative production of oil, gas, or water versus cumulative injection of an injectant fluid. FIG. 2 illustrates one example of a production type-curve (70). A production type-curve may be used to represent a plurality of well pairs. A single production type-curve may be used to represent the relationship of fluid production to injectant fluid injection for multiple well-pairs. The term prototype performance curve is used interchangeably with production type-curve herein.

Solvent bank size means the size (e.g. volume) of the solvent bank injected before switching to post water injection in miscible gasfloods.

Streamline is a path that a particle of an injected fluid would take through a two-or-three dimensional (2-D or 3-D) space (in this case a reservoir) between an injector and a producer. Multiple streamlines between the injector and producer define the swept area between the two wells.

VGR is an acronym for viscous-to-gravity ratio as defined in Eq. 1 herein and discussed in the section concerning selection of representative well pairs.

WAG injection means water alternating gas injection frequently used in miscible gasfloods to mitigate viscous fingering and gravity override of the injected miscible solvent gas.

WAG ratio is the ratio of water to gas in a WAG injection. WAG ratio is typically expressed as a volume ratio calculated at the reservoir conditions.

Embodiments of the present invention may be used to quickly predict and history match field-wide production of oil, gas, and water on a well basis for large pattern waterfloods and miscible gasfloods. The invention is suited to be reduced to a main computer program with several pre-processing steps. Embodiments of the invention may be run on a personal computer, a Unix system or main-frame computer. Embodiments of the invention differ from conventional production type-curve scale-up methods, because of the following unique features:

Fluid allocation using flow-based injector-producer pairs.
Selection of representative well pairs and assignment of production type-curves based on reservoir heterogeneity.
Type-curve correlation equations that account for process parameters such as well flow rate, WAG ratio, solvent bank size, and VGR.
Oil saturation tracking that allows changes to injection or production well flow rates, locations, and process parameters.
Fast matching of the prediction model to field data on a well basis.

FIG. 1 schematically illustrates a part of a larger oil-bearing reservoir. A pattern of injectors numbered (2) through (10) and producers numbered (11) through (14) are drilled into reservoir area (20). To increase the recovery of hydrocarbons from reservoir area (20), a variety of enhanced hydrocarbon recovery techniques may be used whereby a fluid (e.g. liquid, gas, and/or vapor) is injected into the reservoir at one or more injectors (2–10) and hydrocarbons (as well as the injected fluid) are recovered from the reservoir at one or more producers (11–14). The injectors are typically spaced apart from the producers, but one or more injectors could later be used as producers. The injected fluid or injectant can, for example, be a heating agent used in a thermal recovery process (such as steam), any essentially immiscible fluid used in an immiscible flooding process (such as natural gas, water, or brine), and any miscible fluid used in a miscible flooding process (for example, a multiple-contact miscible or near-miscible fluid such as lower molecular weight hydrocarbons, carbon dioxide, or nitrogen). It should be understood that this invention is not limited to any particular physical state of the injected fluid; the injected fluid could be liquid, gas, vapor, or a multi-phase mixture. FIG. 1 also illustrates one geometric pattern and four geometric injector-producer polygons (31, 32, 33 and 34) defined by dotted lines.

Embodiments of the invention use a geological model that characterizes heterogeneous rock properties for the reservoir of interest. Such rock heterogeneity governs the actual flow between injectors and producers. Compared to the geometric approach, the use of a geologic model enables the determination of flow streamlines and thus enables accurate allocation of fluid flowing from an injector to its connecting producers.

After the flow streamlines between neighboring injection and production wells are characterized, two or more, preferably three or more, representative injector-producer pairs are selected based on their connected pore volume distribution for production type-curve generation. The connected pore volume distribution curve of an injector-producer pair is expressed as connected pore volumes inside the pair verses a range of cut-off permeabilities below which no flow is allowed from grid cells to grid cells. The individual distribution curves for each well pair, within the area of interest, are grouped into one of two or more, preferably three or more, types of reservoir heterogeneity, such as narrow, wide, and channel types. From each of the heterogeneity types, one distribution curve with its corresponding injector-producer pair is chosen to represent the type. For example, three representative injector-producer pairs are chosen to represent a narrow degree of reservoir heterogeneity, a wide degree of reservoir heterogeneity and a channel flow regime. The flow characteristics of each well pair within the reservoir area of interest thus correspond to one of the two or more, preferably three or more, heterogeneity types.

Prototype performance curves may then be generated for each of the two or more, preferably three or more, heterogeneity types based upon the data from the representative well pair for each heterogeneity type. In this way all well pairs in the reservoir area of interest may be represented by one of the two or more, preferably three or more, sets of prototype performance curves. For accuracy, the prototype performance curves may be generated using 3-D, 3-phase finite-difference simulation that takes into account the detailed flow and reservoir properties. Other less sophisticated modeling or analog data may also be used. The prototype performance curves are preferably composed as a dimensionless relationship of cumulative injection verses cumulative production and may be expressed as type-curve correlation equations with sets of type-curve correlation parameters. The dimensionless type-curve correlation equations may be scaled-up for an individual well pair based upon the specific attributes of the individual well pair, preferably, using the individual well-pair's pore volume and processing rate. Each individual well-pair within the reservoir area of interest is assigned with one of these type-curve correlation equation sets which will be used to calculate production flow rates from the well pair. Production flow rates from an individual production well are then calculated by summing rates from all well pairs connecting to the producer. In this simple way, the flood performance of the entire reservoir area of interest is predicted relatively accurately.

To make the model more versatile the type-curve correlation equations may be constructed to account for changes in WAG, VGR, solvent bank size and/or injector flow rate. In this way the model can provide production rate predictions that account for changes in the aforementioned variables often encountered during miscible gas injection.

Additionally, the model may be constructed to track the magnitude of oil saturation within gridcells through use of tracer flow calculation in order to provide flexibility for subsequent well rate changes, well shut-ins, or drilling of new injection or production wells. Single-phase flow of a resident tracer is used to approximate the flow of the oil in model gridcells. The tracer calculation results in a tracer concentration profile in gridcells over the entire area of the reservoir of interest. Then, the oil saturation in the gridcells within each individual well pair is equated to the tracer concentration with a particular offset to honor the amount of oil left in the particular well pair. For each well pair, the offset should be the ratio between the amount of oil versus the amount of tracer left inside the boundary of the well pair. This technique may be used to approximate cumulative injection, that is needed in using type-curve correlation equations, for an injector-producer pair that is newly introduced into the model after changes occur to well rates and location.

Embodiments of the invention are at least 50 times faster than 3-D, 3-phase finite-difference simulation while retaining sufficiently high accuracy. Embodiments of the invention can be used to predict flooding performance for project design, well-rate adjustment, solvent re-allocation, infill drilling, project expansion, etc. In addition, two parts of the invention can be used stand-alone. The connected pore-volume distribution scheme can be used alone to evaluate reservoir heterogeneity and recovery potential for new wells. The fast saturation-tracking scheme can be used alone to identify bypassed oil areally.

Schematics of the Invention

Figure 3:
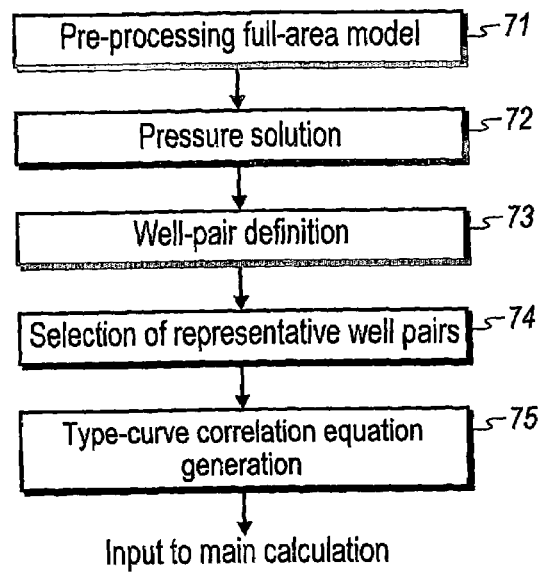
FIG. 3 illustrates the schematics of the pre-processing steps used in some embodiments of the invention.
Figure 4:
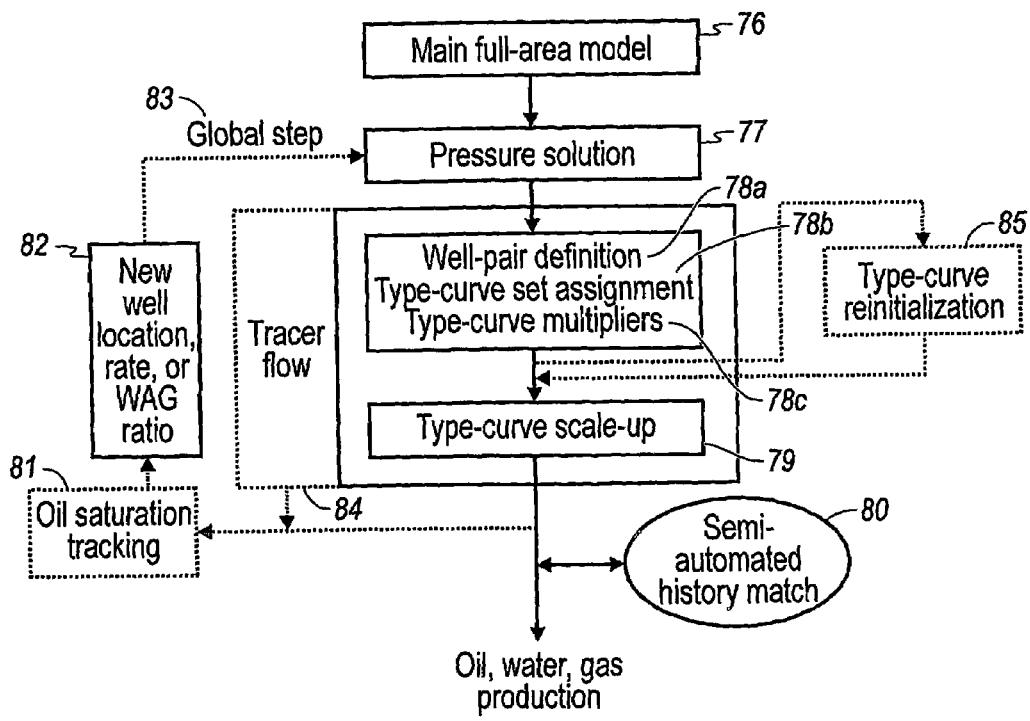
FIG. 4 illustrates the schematics of one embodiment of the invention which depicts process steps that are used in some embodiments of the invention, with solid outlined steps used for predicting performance and dotted outlined steps used only when changes occur to wells and/or process parameters.

For easy illustration and actual applications, embodiments of the invention may be divided into two parts. The first part is referred to as pre-processing for the generation of prototype performance curves, as illustrated in FIG. 3. The second part is referred to as the main calculation for the prediction of oil, gas, water, or other injectant production, as illustrated in FIG. 4. The two schematics will be described below.

Within the following description of the invention and in the drawings, references will be made to a 61-well case and a 1000-well case in which the invention was applied. Both of the cases are based upon a carbonate reservoir located in West Texas. The field has more than 1000 wells under $CO_2$ WAG injection in the middle of the field and under waterflooding at the periphery of the field. The $CO_2$ project area has gone through pattern waterflooding and switched to $CO_2$ WAG injection about 20 years ago. Currently, a few $CO_2$ patterns are under post water injection. The 1000-well case includes the entire field, and the 61-well case includes a section in the south of the field. The large number of wells and long production history make the use of 3-D, 3-phase, finite-difference simulation impractical for managing flooding operations. The current invention is especially suitable for such a large pattern flood with a long production history.

While portions of the following description may focus on water flooding, miscible gas flooding, and WAG flooding it is understood that the following techniques are also applicable to other flooding processes with adjustments. The injected fluid or injectant can, for example, be a heating agent used in a thermal recovery process (such as steam), any essentially immiscible fluid used in an immiscible flooding process (such as natural gas, water, or brine), any miscible fluid used in a miscible flooding process (for example, a multiple-contact miscible or near-miscible fluid such as lower molecular weight hydrocarbons, carbon dioxide, or nitrogen) or any other flooding process known in the art.

Pre-Processing: Single-Phase, 3-D, Full-Area Flow Model

In an embodiment of the invention, a 3-D, single-phase, full-area flow model is prepared for pre-processing (71). Full area means the entire region of interest, which can be a discrete part of a field or the entire field. Full area is used to distinguish from small-scale element models used in generating prototype performance curves. A 3-D model means a three dimensional representation of the reservoir which contains geological properties, such as porosity, permeability, etc., assigned to gridcells. In the alternative, a 2-D model may be used if a 3-D model does not exist.

The full-area model contains injectors and producers specified by flow rates and/or flow potentials. The use of flow rate specifications is preferred. The compressibility of the fluid and rock is set to zero or near zero.

Pre-Processing: Pressure Solution and Well-Pair Definition

The pressure distribution in and fluid fluxes across each gridcell are obtained using a standard pressure solver (e.g., an algorithm relating flow to pressure). After solving the pressure solution (72), resultant x-, y-, and z-fluxes into or out of the corresponding x-, y-, and z-faces of each gridcell are used to define flow-based injector-producer pairs. A well-pair definition method based on a pseudo 3-D approach may then be developed. The method may ignore z-fluxes, lump x- and y-fluxes vertically over stacked gridcells, and trace streamlines using the resultant fluxes. FIG. 1 depicts streamlines for each injector-producer pair. Streamlines (15) are shown to reflect flow of an injected fluid to displace oil in the reservoir area (20).

The well-pair definition method (73) then determines no-flow boundaries for each of the connected injector-producer pairs. The no-flow boundaries of a well pair are defined as the two outermost streamlines (30). Spaces outside the no-flow boundaries (21) are stagnant areas where no fluid flow occurs. The number of streamlines per injector may be set at any number, preferably 10 to 20, more preferably 16 for speedy computation and easy visualization, which results in tracing a streamline starting from an injector at a 22.5° interval. A bisection scheme may be used to extend the outermost no-flow boundaries of the first generated 16 streamlines. The scheme identifies the two back-to-back outermost streamlines of two neighboring well pairs. The angle between the outermost neighboring streamlines is then bisected to 11.25° to start a new streamline. This new streamline extends to the stagnant area and becomes a no-flow boundary for one of the two well pairs. The bisection scheme may be used twice or more to achieve satisfactory extension of no-flow boundaries.

A well pair is bounded by the two outermost no-flow boundaries (30) that slice vertically through the reservoir thickness. The pore volume, processing rate, area, and CPVD of each well pair may be calculated accordingly through techniques known in the art. Therefore, in this step a pressure solver is used to obtain fluxes, which are then used to trace streamlines and define well pairs.

This well-pair definition method (73) may be implemented as a stand-alone tool to define well pairs and visualize well connections. In fact, the method can accommodate 3-D, 1-phase pre-processing models as well as 3-D, 3-phase, finite-difference simulation models. For multiphase flow, fluid fluxes of multiple phases are summed to arrive at total-phase fluxes.

The stand-alone well-pair definition tool can also be used to define flow-based, injector-centered or producer centered patterns and to visualize well connections and patterns for pattern analyses in the management of pattern floods.

Pre-processing: Selection of Representative Well Pairs

Figure 5:
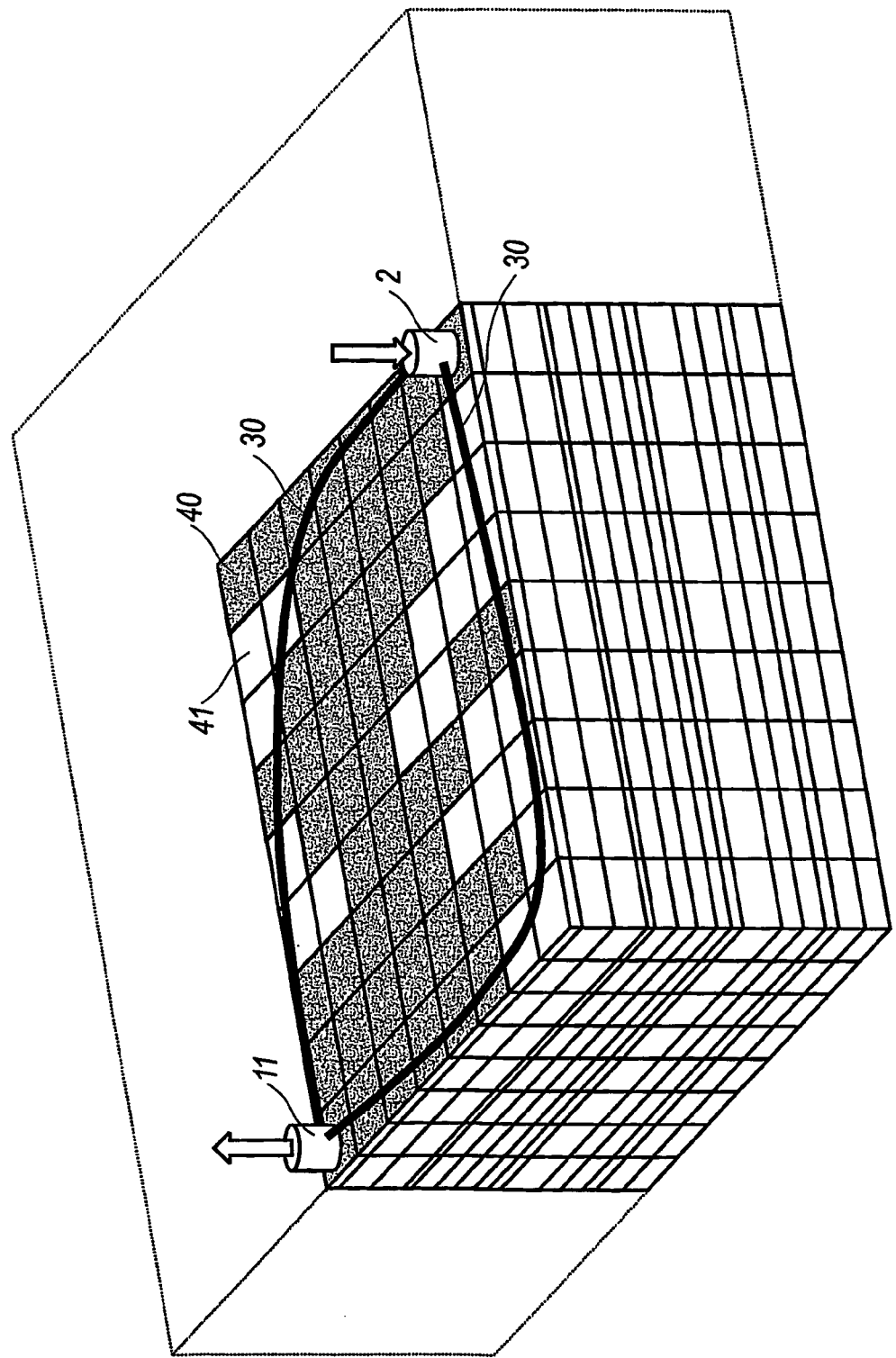
FIG. 5 illustrates a 3-D representation of a segment of a hydrocarbon-bearing reservoir penetrated by one injector-producer pair with shaded gridcells representing those connected to the injector at a specified cutoff permeability.

Prototype performance curves are generated using representative well pairs. The connected pore volume distribution (CPVD) scheme of the present invention quantitatively selects representative well pairs (74) based on reservoir heterogeneity. The CPVD of a well pair is defined as connected pore volume, expressed as the fraction of the well-pair pore volume, versus cutoff permeability. The connected pore volume of an injector-producer pair is the pore volume of the cells that are connected to the injector within individual layers. For selected cut-off permeability, the calculation starts from an injector and progresses layer by layer. A neighboring cell is connected to the injector if its permeability is equal to or greater than a selected cutoff permeability. The calculation proceeds until all the gridcells occupied by a well pair are processed. The CPVD of a well pair is calculated based on the connected gridcells while honoring the corresponding no-flow boundaries. FIG. 5 illustrates a 3-D representation of a segment of a hydrocarbon-bearing reservoir with layers penetrated by one injector-producer pair, including injector (2) and producer (11). In this model, the shaded cells (40) have permeability greater than a selected value of cut-off permeability while unshaded cells (41) have a permeability less than the selected cut-off permeability. Outermost streamlines (30) are also depicted.

CPVD analysis may use a 3-D geological mode to reflect reservoir heterogeneity. Cutoff porosity may alternatively be used in such an analysis, but cutoff permeability is preferred.

Figure 6:
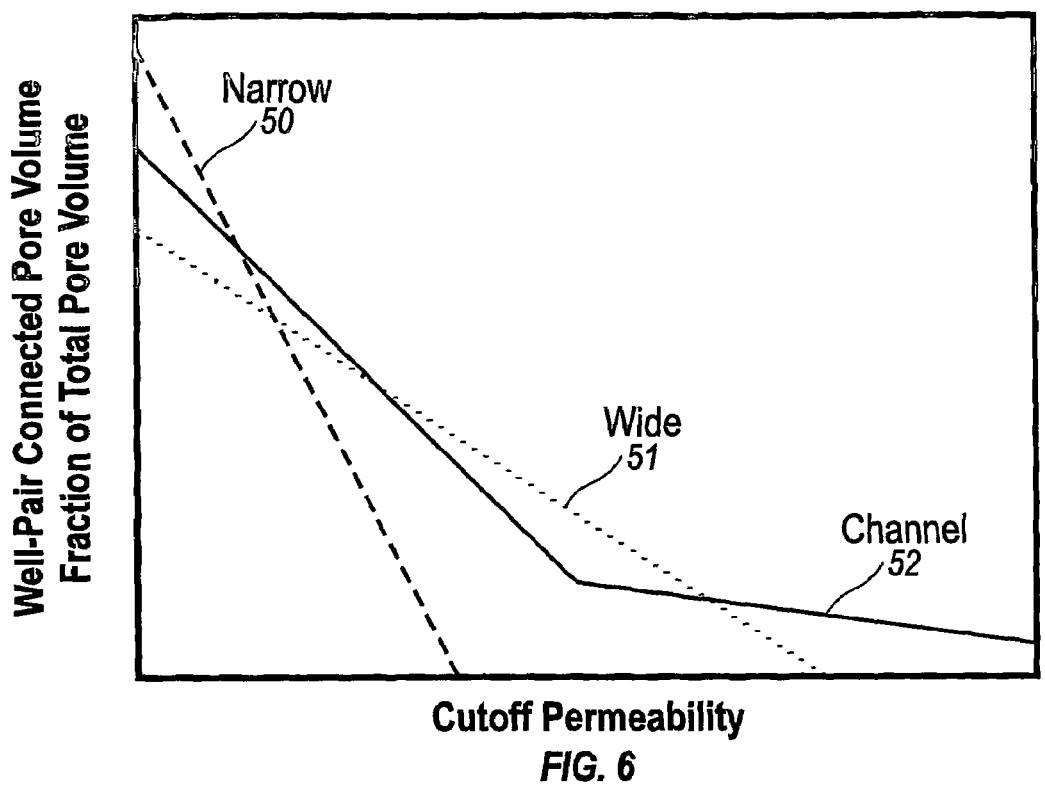
FIG. 6 illustrates connected pore volume distributions characterized as narrow, wide, and channel distributions.

A homogeneous model has a 'step' type of CPVD. Any deviations from the step function reflect levels of reservoir heterogeneity. In general, CPVD can be grouped into two or more, preferably three or more distributions. FIG. 6, illustrates the grouping of CPVD into three heterogeneity types of narrow distribution (50), wide distribution (51), and channel distribution (52). A narrow distribution type (50) indicates a smaller degree of rock heterogeneity within the flow path of an injector-producer pair. A wide distribution type (51) indicates a larger degree of rock heterogeneity within the flow path of an injector-producer pair. The channel distribution type (52) indicates the existence of a high permeability channel within the flow path of an injector-producer pair.

Figure 7:
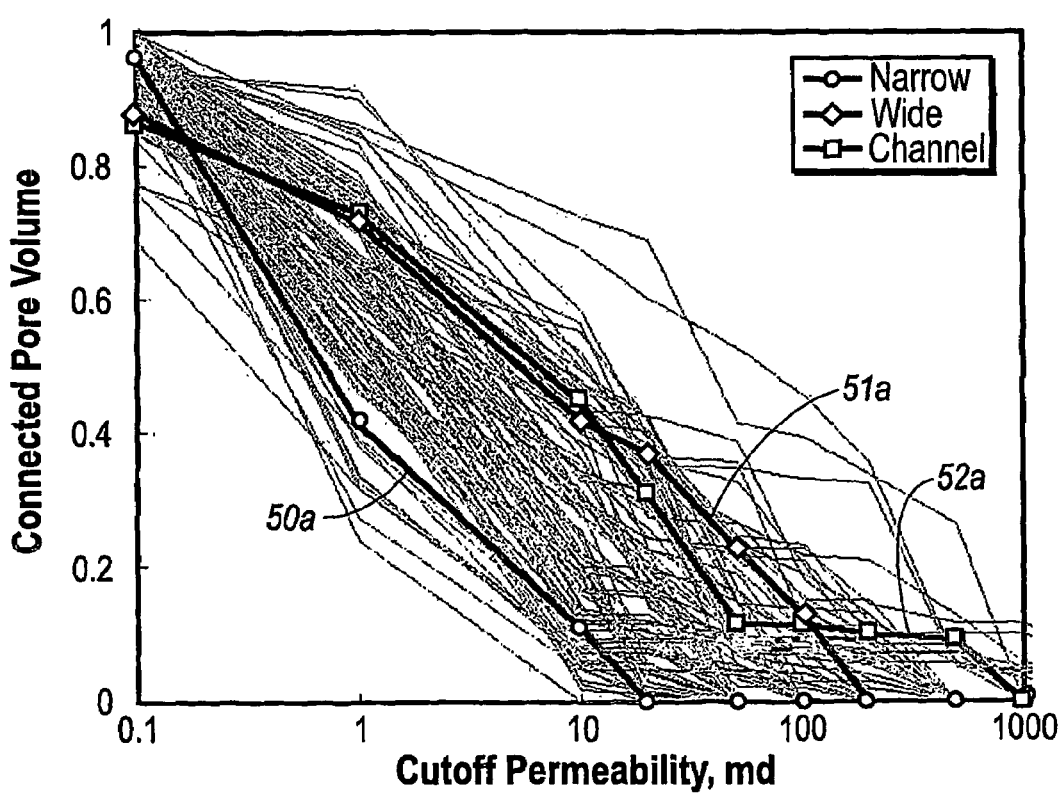
FIG. 7 shows 101 connected pore volume distributions (CPVD) for 101 injector-producer pairs from a segment model containing 61 injectors and producers.
Figure 8:
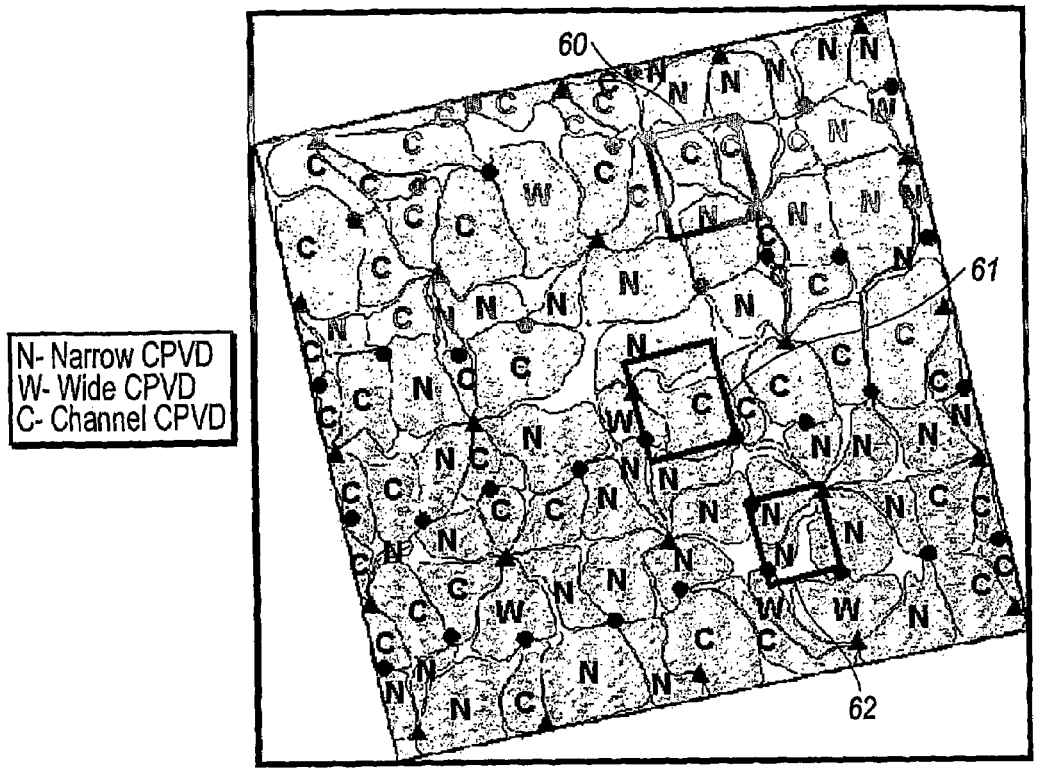
FIG. 8 shows the top view of a 61-well model with injector-producer pairs represented by one of the narrow, wide, and channel distributions shown in FIG. 7.

FIG. 7 illustrates the application of CPVD analysis for 101 well pairs in the 61-well, 30-layer field model. Using engineering judgement, for example, three injector-producer pairs are selected to represent the three heterogeneity types of the narrow (50a), wide (51a), and channel (52a) distributions. FIG. 8 illustrates the representation of each well pair by one of the heterogeneity types: the narrow, wide, or channel distributions. It also illustrates three element models (60, 61 and 62), each encompassing a quarter of a 9-spot pattern and containing at least one well pair that is characterized by one of the three heterogeneity types.

Figure 9:
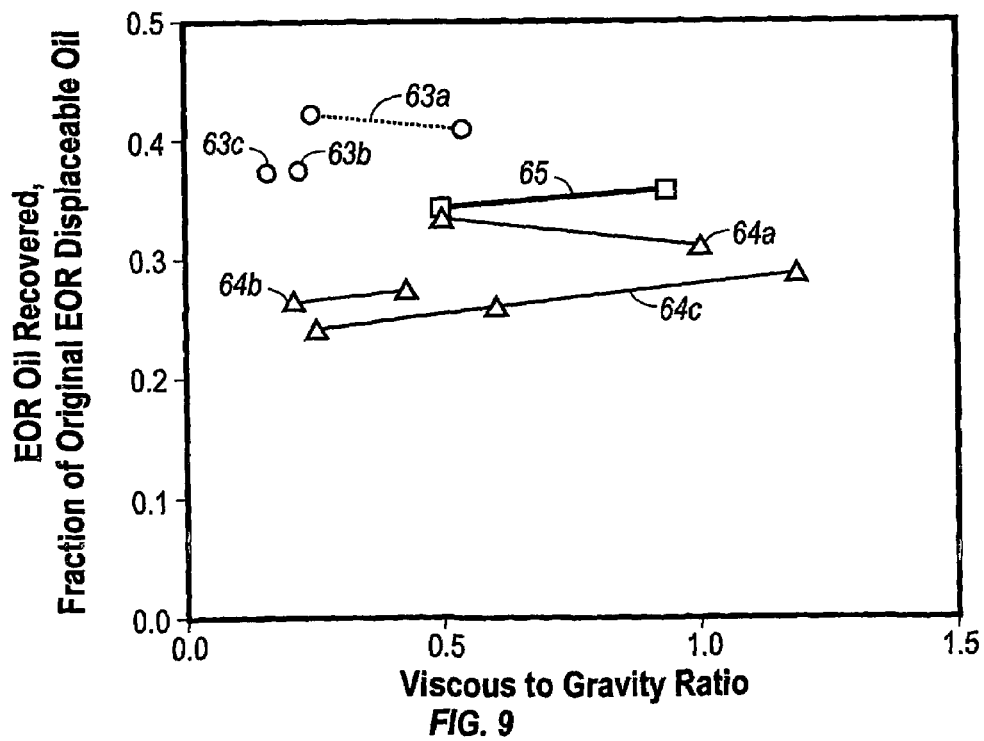
FIG. 9 illustrates oil recovery from the EOR contribution correlating with the narrow, wide, and channel CPVD characterizations for seven well pairs from the 3 element models described in FIG. 8. The EOR contribution is discussed in detail in the section relating to type-curve generation.

The underlying principle of the CPVD scheme is that well-pair CPVD roughly correlates with well-pair flooding performance. This may be illustrated using simulation results obtained from the three element models. Limited compositional finite-difference simulation is conducted for WAG injection following a period of waterflooding. In the case illustrated in FIG. 8 the three elemental models contain seven well pairs characterized by the three heterogeneity types. FIG. 9 illustrates simulated oil recovery generated from a 3-D, 3-phase finite difference simulation from the EOR contribution grossly correlating with the heterogeneity types of CPVD for the seven well pairs depicted in FIG. 8. As can be seen, the three well pairs characterized as narrow (63a, 63b, 63c) are grouped together, while the three well pairs characterized as channel (64a, 64b, 64c) are also grouped together. The sole well-pair characterized as wide (65) has EOR oil recovery lower than the narrow well-pairs and greater than the channel well-pairs. The oil recovery from the EOR contribution is described in detail in the section concerning production type-curve generation. Well pairs characterized by the narrow heterogeneity have the best performance, reflecting good sweep with least reservoir heterogeneity. Well pairs characterized by the channel heterogeneity have the worst performance, reflecting poor sweep in the presence of flow channels.

The CPVD scheme for selecting representative well pairs greatly enhances the predictive capability of this invention. In addition, the CPVD scheme can also be used to characterize reservoir heterogeneity and screen performance for new wells.

When gravity segregation between water and solvent is significant in a miscible WAG injection, this invention may use a two-step grouping for selecting representative well pairs. Well pairs are grouped first by viscous-to-gravity ratio (VGR), followed by the CPVD method. The VGR of a well pair may be calculated as $$VGR = Q_t / (\Delta \rho k_v a (\lambda_{g,cone} + \lambda_{w,cone}))  \quad \text{Eq. 1}$$

for WAG injection. Determination of VGR is known to those skilled in the art (see the paper by Stone, H. L., *Vertical Conformance in an Alternating Water-Miscible Gas Flood*, SPE 11130, presented at the SPE 57th Annual Technical Conference and Exhibition, New Orleans, 1982), which is incorporated herein by reference. Generally, severe gravity segregation exists if VGR is smaller than 0.1. Little gravity segregation exist if VGR is greater than 1. The grouping by VGR is preferably conducted as follows:

High gravity-override group: VGR<0.2
Medium gravity-override group: $0.2 \leq VGR \leq 0.6$
Low gravity-override group: VGR>0.6

This step can be further refined if severe gravity segregation exists. The grouping by CPVD is then conducted following the grouping by VGR. Thus the output of the this step is the selection of the two or more, preferably three or more, representative well pairs upon which the representative prototype performance curves can be generated.

Preprocessing: Type-Curve Correlation Equation Generation Using 3-Phase, 3-D Simulation Prototype performance curves may be expressed as dimensionless cumulative production versus dimensionless cumulative injection (FIG. 2). These type curves may be formulated in type-curve correlation equations (75), for example, for waterfloods and miscible WAG injection.

For a waterflood (WF), oil production from an injector-producer pair is normalized by original waterflood displaceable oil (WDOI). The original waterflood displaceable oil saturation is defined as $S_{WDOI} = S_{oi} - S_{orw}$. The dimensionless water flood oil production type-curve correlation equation may be expressed as, $$x_w = I_w / (PVS_{WDOI})_{wp} \quad \text{Eq. 2}$$

$$N_{owd} = f_{ho}\left[a_{wo}d_{wo}\left(1 - (1-bt_{wo})e^{-(x_w-bt_{wo})/(1-bt_{wo})^n}\right) + a_{wo}bt_{wo}(1-d_{wo})\right] \quad \text{if } x_w \geq bt_{wo} \quad \text{Eq. 3}$$

$$= f_{ho}[a_{wo}x_w + m_{wo}x_w(bt_{wo} - x_w)] \quad \text{if } x_w < bt_{wo} \quad \text{Eq. 4}$$

There are five WF oil type-curve correlation parameters, $bt_{wo}$, $m_{wo}$, $a_{wo}$, $d_{wo}$, and n. These correlation parameters are essentially type-curve equation coefficients used to fit the type curve to the simulation (e.g. 3-D, 3-phase simulation) results. These type-curve correlation equations can be reduced to a plug flow representation, when all the parameters are set to 1. The subscript of wp represents a well pair, and the value in the bracket should honor no-flow boundaries of the well pair. Correlation parameter $f_{ho}$ adjusts the oil type-curve correlation equation for history matching. Parameter $f_{ho}$ is set to 1 when fitting the type-curve correlation equations (2–4) to the injection and production from a well pair obtained from 3-D, 3-phase element-model simulation.

If 3-D, 3-phase element-model simulation contains more than one injector-producer pairs, the stand-alone well-pair definition tool discussed before herein may be used to define those well pairs. Injector and producer fluids are then allocated to these well pairs, enabling the generation of production type-curve for each of these well pairs from 3-D, 3-phase element-model simulation.

For a miscible gasflood, production is treated in two parts one part from the base waterflood and one part from the EOR contribution. The base waterflood means a hypothetical waterflood without injection of any miscible solvent, and it is formulated as a waterflood. Here, the focus is on type-curve correlation equations for oil production, solvent production, and lean gas production from the EOR contribution. All the type-curve correlation equations are normalized by original EOR displaceable oil (EDOI). The original EOR displaceable oil saturation is defined as $S_{EDOI}=S_{orw}-S_{orm}$. The dimensionless EOR oil, solvent, and lean gas type-curve correlation equations are expressed as, $$x_s = (I_t/(R_{WAG}+1))/(PVS_{EDOI})_{wp} \quad \text{Eq. 5}$$

$$N_{oed} = f_{ho}[f_{ago}a_{go}(1-e^{-d_{go}(x_s-bt_{go})/(1-bt_{go})})] \quad \text{if } x_s \geq bt_{go} \quad \text{Eq. 6}$$

$$= 0 \quad \text{if } x_s < bt_{go} \quad \text{Eq. 7}$$

$$N_{sd} = f_{hs}[f_{ags}$$
$$a_{gs}(x_s + 0.01 - (1-(1-bt_{gs})e^{-d_{gs}(x_s-bt_{gs})/(1-bt_{gs})}))^{p_{gs}}]$$
$$\text{if } x_s \geq bt_{gs} \quad \text{Eq. 8}$$

$$= 0 \quad \text{if } x_s < bt_{gs} \quad \text{Eq. 9}$$

$$N_{lged} = f_{hlg}N_{oed}C_{lg}(b_{lg}+1) \quad \text{Eq. 10}$$

There are eight correlation parameters for the EOR oil, solvent, and lean gas type-curve correlation equations: three EOR oil type-curve correlation parameters, $bt_{go}$, $a_{go}$, and $d_{go}$; four EOR solvent type-curve correlation parameters; $bt_{gs}$, $a_{gs}$, $d_{gs}$, and $p_{gs}$; and one EOR lean-gas type-curve correlation parameter, $b_{lg}$. Table 1A lists a set of these parameters obtained from the 61-well case. EOR lean gas means light hydrocarbons or solution gas produced due to the miscible solvent. Parameter $b_{lg}$ reflects the extraction of lean gas from live oil by the solvent, beyond the dissolution of lean gas in the live oil.

Figure 10:
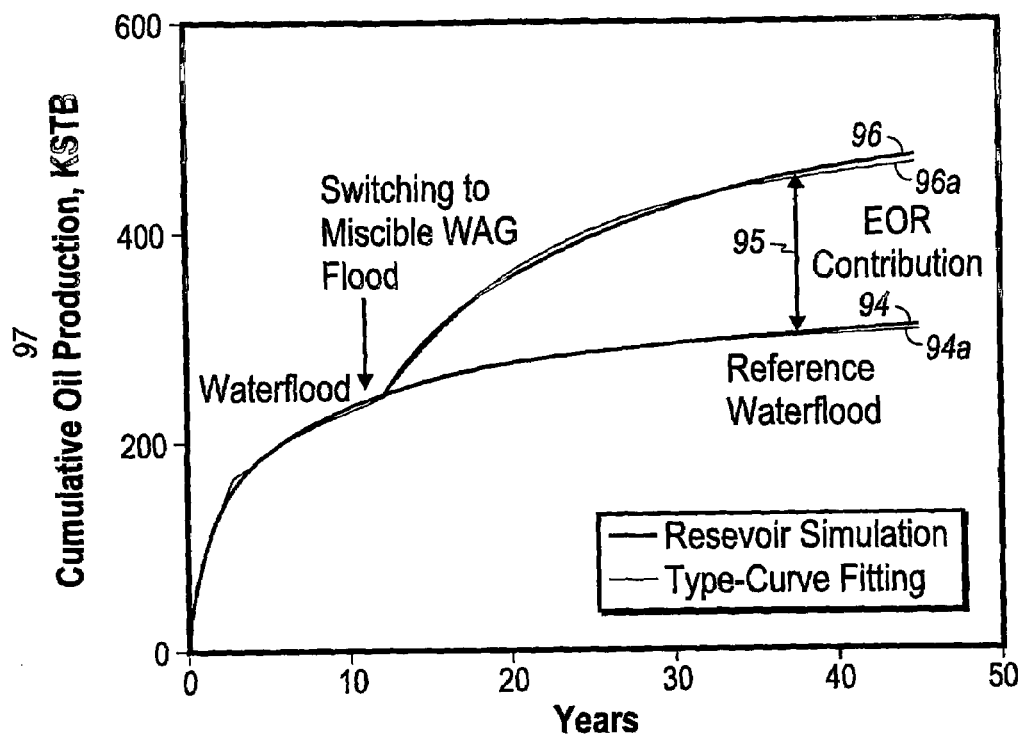
FIG. 10 illustrates simulation results for waterflooding followed by miscible WAG injection and the treatment of WAG injection as the EOR contribution additive to the base waterflood curve.
Figure 11:
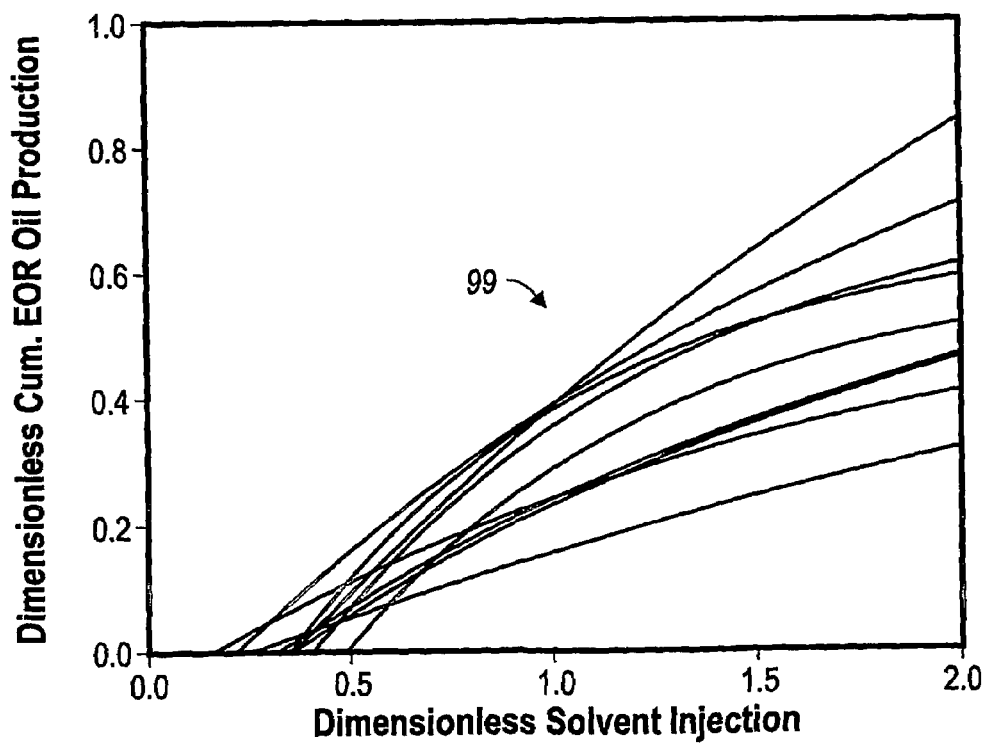
FIG. 11 shows the spreading of ten sets of base EOR oil type curves obtained from reservoir simulation for ten injector-producer pairs selected from a 1000-well pattern waterflood and $CO_2$ WAG flood.

To derive these parameters from each element model, two 3-D, 3-phase finite difference simulation runs are completed. The first simulation run is for a miscible WAG injection (96) following a period of waterflooding using the base WAG ratio and well rates. The second simulation is for the base waterflood (94) under the same rates. FIG. 10 illustrates simulated oil production (97) from the miscible WAG injection (96) and from the base waterflood (94). The difference between the two curves is the EOR contribution (95) used to fit Eq. 6–7 for the EOR oil parameters. The fitting is rather good between the EOR oil type-curve correlation equation (94a, 96a) and 3-D, 3-phase simulated representative production (94, 96). FIG. 11 shows the spread of ten EOR oil base production type-curves (99) derived from ten well pairs in the 1000-well, full-field case.

EOR oil type-curve equation multiplier $f_{ago}$ and EOR solvent type-curve equation multiplier $f_{ags}$ are set up to adjust the base EOR oil and solvent type-curve correlation equations, either up or down, for effects of WAG ratio and VGR. When significant gravity segregation exists, VGR accounts for the effects of gravity override. When little gravity segregation exists, VGR here accounts for the effects of well rates. Dependence of the oil and solvent type-curve equation multipliers on WAG ratio and VGR are expressed in a table format (Table 1B).

TABLE 1

(A) WF and EOR Type-Curve Correlation Parameters

| | | |
|---|---|---|
| WF oil type-curve parameters | $bt_{wo}$ | 0.416 |
| | $m_{wo}$ | 1.761 |
| | $a_{wo}$ | 0.959 |
| | $d_{wo}$ | 0.347 |
| | n | 0.279 |
| EOR oil type-curve parameters | $bt_{go}$ | 0.066 |
| | $a_{go}$ | 0.193 |
| | $d_{go}$ | 1.072 |
| EOR solvent type-curve parameters | $bt_{gs}$ | 0.175 |
| | $a_{gs}$ | 1.158 |
| | $d_{gs}$ | 0.113 |
| | $p_{gs}$ | 1.000 |
| EOR lean gas type-curve parameter | $b_{lg}$ | 6.5 |

(B) EOR Oil and Solvent Type-Curve Correlation Eq. Multipliers

| $R_{WAG}$ | VGR | EOR oil multiplier, $f_{ago}$ | EOR solvent multiplier, $f_{ags}$ |
|---|---|---|---|
| 1 | 0.07 | 0.512 | 1.021 |
| 1 | 0.18 | 0.839 | 1.039 |
| 1 | 0.35 | 1.201 | 0.981 |
| 2 | 0.08 | 0.838 | 1.104 |
| 2 | 0.20 | 1 (base) | 1 (base) |
| 2 | 0.38 | 1.201 | 0.981 |
| 4 | 0.08 | 1.294 | 1.141 |
| 4 | 0.17 | 1.264 | 0.985 |
| 4 | 0.37 | 1.312 | 0.896 |

(C) PWF Type-Curve Correlation Parameters for Effect of Solvent Bank Size

| Total solvent injection, $x_{st}$ | PWF oil parameter, $a_{pwo}$ | PWF solvent parameter, $a_{pws}$ |
|---|---|---|
| 0.30 | 0.064 | 0.114 |
| 0.91 | 0.028 | 0.164 |
| 1.21 | 0.020 | 0.183 |
| 1.51 | 0.020 | 0.226 |

The EOR oil and solvent type-curve correlation equation multipliers may be derived using various WAG ratios and VGR values in 3-D, 3-phase element-model simulation runs. Simple shifting of the base EOR oil, or solvent, production type-curve correlation equations by a multiplier is adequate to accommodate the effects of WAG ratio and VGR, as evidenced in the 61-well and 1000-well cases.

After switching from miscible WAG injection to post water injection, i.e., the post waterflood (PWF), the EOR oil and solvent type-curve correlation equations may be expressed as, $$x_{pw}=I_{pw}/(PVS_{EDOI})_{wp} \quad \text{Eq. 11}$$

$$N_{oed}=f_{ho}[a_{pwo}((R_{WAGB}+1)/(R_{WAG}+1))(1-e^{-x_{pw}})]+$$
$$N_{oed}(x_{st}) \quad \text{Eq. 12}$$

$$N_{sd}=f_{hs}[a_{pws}((R_{WAGB}+1)/(R_{WAG}+1))^{0.25}(1-e^{-x_{pw}})]+$$
$$N_{sd}(x_{st}) \quad \text{Eq. 13}$$

PWF oil and solvent production type-curve correlation parameters $a_{pwo}$ and $a_{pws}$ were designed to accommodate continual oil and solvent production after switching to a post waterflood. The correlation parameters are expressed as a function of final solvent bank size, $x_{sf}$ (Table 1C), because the total amount of solvent injection affects levels of oil and solvent production after switching to post water injection. The PWF type-curve correlation equations provide a good fit for various solvent bank sizes used in 3-D, 3-phase element-model simulations.

To summarize, one complete set of production type-curve correlation parameters and multipliers includes five waterflood oil production type-curve correlation parameters, three EOR oil production type-curve correlation parameters, four EOR solvent production type-curve correlation parameters, one lean-gas production type-curve correlation parameter, a table of EOR oil and solvent production type-curve correlation equation multipliers versus WAG ratio and VGR, and a table of PWF oil and solvent production type-curve correlation parameter versus final solvent bank size. A sample set is shown in Table 1.

About 20 finite-difference simulation runs can be required to generate a set of type-curve correlation equations representing prototype production from each selected type of reservoir heterogeneity. The effort to complete such 20 simulation runs does not require substantial computing time, since each simulation run requires a slight change to the model input and takes less than 5 minutes of CPU time on a standard computer.

The output of this step includes the two or more, preferably three or more, sets of production type-curve correlation equation parameters. The output also includes sets of adjustment factors or type-curve correlation equation multipliers, that can be used to adjust the base production type-curve correlation equations, for changes in process parameters such as WAG, VGR and solvent bank size. The type-curve correlation equations developed (75) for embodiments of this invention greatly enhance the flexibility of accounting for key process parameters such as well rate, WAG ratio, VGR, solvent bank size, and post waterflood. The type-curve correlation equation parameters and adjustment type-curve correlation equation multiplier tables may be used in the main model calculation.

Main: Single-Phase, 2-D, 2-Tracer, Full-Area Flow Model

FIG. 4 illustrates the schematics of the main calculation for some embodiments of the invention. A full-area, 1-phase, 2-D, 2-tracer flow model (76) may be used for the body of the calculation. Such a model may use the following input:

- A 2-D model consisting of a vertically averaged description of the 3-D reservoir. The model can be multiple-zone to present multiple non-communicating, stacked zones. The model can also be 3-D if computation speed is not critical.
- Two resident tracers
- Yearly well locations and well rates
- Initial pressure
- Original $S_{WDOI}$ and $S_{EDOI}$ for the field
- Beginning oil saturations $S_{WDO,0}$ and $S_{EDO,0}$ that correspond to the original field conditions at the start of the calculation, such as the end of primary production or some stage of waterflooding.
- Beginning tracer concentrations $C_{WDOTRC,0}$ and $C_{EDOTRC,0}$ that equal to beginning oil saturations
- Type-curve correlation equation scale-up flag for waterflooding, WAG injection, or post water injection for each injector
- Yearly WAG ratio for each injector under WAG injection
- Well-pair vertical permeability for the VGR calculation
- Total solvent bank size for each injector that switches to post water flood injection
- Sets of production type-curve correlation parameters and associated type-curve correlation equation multiplier tables calculated from the pre-processing steps
- A set of type-curve correlation equation parameters assigned to each well pair. The assignment can come from the pre-processing, or a preliminary run of the main model, or the semi-automated history-match process (see the history match section)

Main: Pressure Solution

In the body of the calculation, the pressure solver (77) is activated to generate fluid flow fluxes for defining flow-based injector-producer pairs. The pressure solver (77) may be deactivated immediately thereafter to save computation time. It is reactivated at the global step (83) after a well or process change (82), as indicated in the schematics in FIG. 4. The main incentive to keep the full-area main model (76) two dimensional, instead of fine-layer 3-D, is for a speedy pressure solution (77), especially for a model with hundreds of wells and numerous well changes throughout the flood history. The output from this step is fluid fluxes across faces of each gridcells to be used in the next step for streamline generation and well-pair definition (78a).

Main: Well-Pair Definition

The same method of well-pair definition (78a) described for pre-processing may be built into the main calculation, Fluid flow fluxes from the pressure solver are used to trace streamlines and generate well pair boundaries, followed by well-pair processing rate, pore volume, and area. In the subsequent production type-curve scale-up step (79), well-pair processing rate is used as injection throughput, well-pair pore volume is used in dimensionless type curves, and well-pair area is used in determining VGR. The flow-based well-pair definition (78a) increases the predictive accuracy for the invention. The output of this step includes well-pair definition (78a) and well-pair processing rates, pore volumes, and areas.

Main: Type-Curve Correlation-Equation Parameter Set Assignment

Preferably, two approaches may be used to assign a set of type-curve correlation equations (78b) to each well pair within the reservoir area. The first is the heterogeneity approach that assigns a set of type-curve correlation equation parameters to each well pair based on the CPVD characteristics. This approach is preferred for floods having little production history or new infill wells. The CPVD characteristics can be carried out using the pre-processing steps taught herein (see FIG. 3), either using the CPVD characteristics directly from the pre-processing model, or calculating the CPVD characteristics automatically within the main model. The former becomes impractical when hundreds of wells and frequent well changes are involved. The latter requires the import of 3-D permeability (kx and ky), porosity, pore volume, and keyout properties to the main calculation from a 3-D, fine-layer, pre-processing model or other suitable model. This method will keep the main model two dimensional for speedy pressure solution and to use the imported 3-D fine-layer descriptions for CPVD when needed. After CPVD characteristics are calculated for all well pairs, the main program may be stopped. The CPVD results are then analyzed. A set of type-curve correlation-equation parameters is assigned (78b) to each well pair.

The second approach is the history-match approach that assigns a set of type-curve correlation-equation parameters ($78b$) to each producer, i.e., to all well pairs associated with that producer, based on production history. This approach will be discussed in more detail in the section concerning semi-automated history match (80). The history-match approach is preferred for fields with a large number of wells and substantial production history. The output of this step therefore includes the assignment of all well pairs within the area of interest to one of the two or more, preferably three or more, sets of type-curve correlation-equation parameters ($78b$).

Main: Type-Curve Correlation Equation Multiplier Interpolation

After a set of type-curve correlation-equation parameters is assigned ($78b$) to each well pair, for WAG injection the EOR oil and solvent type-curve correlation equation multipliers ($78c$) are interpolated from the type-curve correlation equation multiplier tables. The interpolation is conducted based on the WAG ratios input and VGR's calculated from Eq. 1. At this stage, all the well pairs are defined; well-pair processing rates and pore volumes are determined; and all type-curve correlation-equation parameters and multipliers are specified. The main model is ready for type-curve correlation equation scale-up (79) to calculate well-level and field-level oil, gas, and water production rates.

Main: Type-Curve Scale-Up

Type-curve correlation equation scale-up (79) is accomplished in the following way. All the type-curve correlation equations, Eq. 2–13, are built in the main calculation. At the start of waterflood, a flag is set to start the calculation of oil, gas, and water production from the waterflood production type-curve correlation equations. For every well pair, Eq. 2 is first calculated for dimensionless water injection, followed by Eq. 3–4 for dimensionless waterflood oil production. Actual cumulative oil production is calculated as:

$$N_{ow} = N_{owd}(PVS_{WDOI})_{wp}/B_o \qquad \text{Eq. 14}$$

Production of dissolved lean gas is calculated based on oil production and the lean gas to oil ratio.

$$N_{lgw} = f_{hlg} N_{ow} C_{lg} \qquad \text{Eq. 15}$$

Water production is calculated based on the overall material balance.

$$N_{ww} = f_{hww}(x_w - N_{owd})(PVS_{WDOI})_{wp}/B_w \qquad \text{Eq. 16}$$

Of course, a type-curve correlation equation may be developed for the water production. Actual well-pair rates, $Q_{ow}$, $Q_{lgw}$, and $Q_{wt}$, are calculated based on the corresponding cumulative production.

At the start of a miscible gasflood, a flag is set to start the calculation of oil, gas, and water production from the miscible flood production type-curve correlation equations. For every well pair, production is calculated in two parts, from the base waterflood contribution and from the EOR contribution. Production from the base waterflood is identical to what is described above. For the EOR contribution, Eq. 5 is first calculated to obtain the dimensionless solvent injection. Eq. 6–7 are used to obtain the dimensionless EOR oil production, Eq. 8–9 to obtain the dimensionless EOR solvent production, and Eq. 10 to obtain the dimensionless EOR lean gas production.

If an injector is switched to post water injection at a particular time, then a post-water-injection flag is set to start the calculation of oil and solvent production from the post-waterflood type-curve correlation equations defined by Equations 11–13.

The calculation of actual EOR oil, solvent, and lean gas production from the dimensionless type-curve correlation equations is accomplished in the following way:

$$N_{oe} = N_{oed}(PVS_{EDOI})_{wp}/B_o \qquad \text{Eq. 17}$$

$$N_s = N_{sd}(PVS_{EDOI})_{wp}/B_s \qquad \text{Eq. 18}$$

$$N_{lge} = N_{lged}(PVS_{EDOI})_{wp}/B_o \qquad \text{Eq. 19}$$

The total cumulative production of oil, lean gas, and solvent is calculated by summing up contributions from the base waterflood and EOR:

$$N_{ot} = N_{ow} + N_{oe} \qquad \text{Eq. 20}$$

$$N_{lgt} = N_{lgw} + N_{lge} \qquad \text{Eq. 21}$$

$$N_{gt} = N_{lgt} + N_s \qquad \text{Eq. 22}$$

Cumulative water production may be calculated from the overall material balance.

$$N_{wt} = f_{hwt}(I_t - N_{ow}B_o - N_{oe}B_o - N_S B_s)/B_w \qquad \text{Eq. 23}$$

Actual well-pair rates $Q_{oe}$, $Q_{ow}$, $Q_{lge}$, $Q_{lgw}$, $Q_{lgt}$, $Q_s$, and $Q_{wt}$ are calculated based on the corresponding cumulative production.

The production rate from a producer is calculated by summing up production rates from all connecting well pairs for oil, water, lean gas, or solvent. Cumulative production from the producer is then calculated based on the production rates. The calculation of oil, gas, and water production continues for specified time steps, or until changes occur to well locations and rates. Therefore, the output from this step includes the calculated production of oil, water, and lean gas for individual producers under waterflooding and the calculated production of oil, water, miscible solvent, and lean gas for individual producers under miscible gas flooding.

Main: Calculations to Accommodate Changes to Well Rates, Well Locations, WAG Ratios Calculations shown by dotted lines in the main schematics in FIG. 4 are formulated to handle changes to well rates, well locations, and WAG ratios (82). These calculations include tracking oil saturation (81) immediately before the changes, solving the pressure solution (77) immediately after the changes, defining new well pairs (78a), assigning type-curve correlation equation parameter sets (78b) for the new well pairs, calculating type-curve correlation equation multipliers (78c), reinitialize type-curve scale-up (79), and back to the routine type-curve scale-up (79), as described in the following three sections.

Main: Oil-Saturation Tracking Immediately Before Changes

The oil saturation-tracking scheme (81) is used to adjust for a well or process change. This scheme provides a smooth oil-saturation gradient between an injector and producer and maintains the oil material balance on a well-pair basis. It is achieved using single-phase resident tracer flow simulation (84) and oil production from type curves.

Single-phase resident tracer simulation (84) alone is straightforward for those skilled in reservoir simulation. A resident tracer is initiated in each gridcell with a concentration equivalent to the beginning oil saturation. The single-phase fluid is injected into injectors, and it sweeps the resident tracer to producers. Honoring the definition of well-pair boundaries, tracer production is calculated for each well pair. The tracer production from each well pair and tracer concentrations in gridcells are used to calculate oil saturation in gridcells.

Both water flood displaceable oil WDO and EOR displaceable oil EDO are tracked independently, requiring two resident tracers. A resident tracer, WDOTRC, is initialized at $C_{WDOTRC,0}=S_{WDO,0}$, and another resident tracer, EDOTRC, is initialized at $C_{EDOTRC,0}=S_{EDO,0}$. Simulation of resident tracer flow is conducted throughout all the steps, as shown in FIG. 4. The WDO calculation is explained below. When the tracking is activated, $C_{WDOTRC}$ is converted to $S_{WDO}$ as follows:

$$f_{WDO,wp}=((PVS_{WDO,0})_{wp}-N_{ow}B_o)/(PVC_{WDOTRC})_{wp} \text{ per well pair} \quad \text{Eq. 24}$$

$$S_{WDO}=C_{WDOTRC}f_{WDO,wp} \text{ per gridcell} \quad \text{Eq. 25}$$

(PV $S_{WDO,0}$)$_{wp}$ and (PV $C_{WDOTRC}$)$_{wp}$ are calculated honoring well-pair boundaries. $S_{WDO}$ is calculated by multiplying $f_{WDO,wp}$ with $C_{WDOTRC}$ to satisfy the WDO material balance within each well pair. Complications arise for a grid shared by two well pairs. Two $f_{WDO,wp}$ values are calculated for the same grid, and they are averaged on a PV-weighted basis for the grid. Another complication may arise for those grids close to a producer. When $f_{WDO,wp}$ is greater than 1, $S_{WDO}$ may become larger than $S_{WDOI}$. For simplicity, a limit is set that $S_{WDO}$ cannot exceed $S_{WDOI}$. These two complications may compromise the WDO material balance for some well pairs. Therefore, the process of calculating $S_{WDO}$ is iterated by replacing $C_{WDOTRC}$ with the old $S_{WDO}$ in Eq. 24–25 and then calculating a new $f_{WDO,wp}$ and new $S_{WDO}$. The process may continue until a set tolerance on the WDO material balance is satisfied.

The EDOTRC tracer is handled in the same way except that $C_{EDOTRC}$ has to be reset to $S_{EDO,0}$ at the start of solvent injection. The reset is necessary because TRCWDO and TRCEDO are calculated in all steps (FIG. 4).

To save computational time, this saturation-tracking scheme is activated only right before a well or process change, or at a time step to check bypassed oil in the reservoir. The tracking enables the re-initiation of production type-curve scale-up (discussed below) and greatly enhances the flexibility of accommodating well or process changes.

Main: Pressure Solution, Well-Pair Definition, Type-Curve Correlation Equation Parameter Set Assignment, and Type-Curve Correlation Equation Multiplier Interpolation Immediately After Changes As mentioned before, the pressure solver (77) is activated in the global step immediately after changes occur to wells and/or process parameters (82) as shown in FIG. 4. New well pairs are generated (78a) based on fluid fluxes from the new pressure solution (77). A set of type-curve correlation equation parameters is then assigned (78b) to each new well pair, following the heterogeneity approach or the history-match approach. Then, the EOR type-curve correlation equation multipliers (78c) are interpolated for each well-pair, based on the associated multiplier tables. The next step is to reinitialize cumulative injection for type-curve correlation equation scale-up (79). One note before proceeding. The above steps of pressure solution (77), well-pair definition (78a), and type-curve correlation equation assignment (78b) can be skipped if changes do not involve well locations and rates, i.e., when the well-pair definition is not affected by the changes.

Main: Type-Curve Re-initialization Immediately After Changes

How the calculation proceeds along a type-curve correlation equation for a well pair as further injection begins immediately after well and process changes is now discussed as type-curve re-initialization (85). Such calculation is carried out by estimating the hypothetical cumulative injection for each well pair, and using the cumulative injection as the starting point to proceed after the changes. The word 'hypothetical' has special meaning for those well pairs that did not exist prior to the changes.

Figure 12:
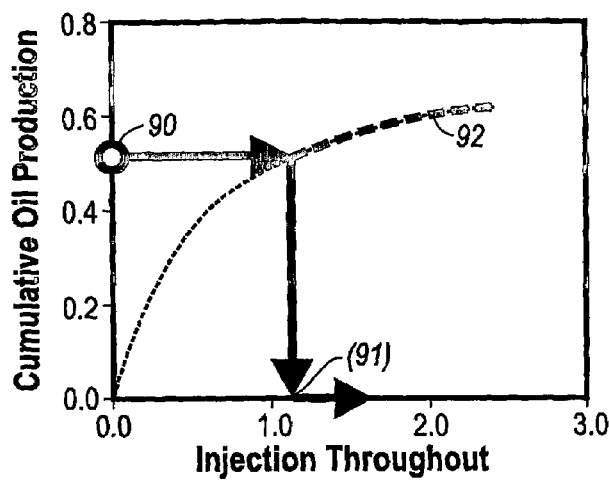
FIG. 12 illustrates re-initialization of a type curve using hypothetical oil production for a new well pair generated after changes occur to wells and process parameters.

Referring to FIG. 12, the tracked oil saturation (81) in the underlying gridcells is used to estimate hypothetical cumulative production (90) for individual well pairs. Use waterflooding as an example. First, the hypothetical production (90) of a well pair is calculated based on the waterflood displaceable oil saturation in gridcells:

$$N'_{owd}=1-(S_{WDO})_{wp}/(S_{WDOI})_{wp} \quad \text{Eq. 26}$$

Then, the hypothetical cumulative injection (91) is extrapolated from the cumulative hypothetical production (90) and the corresponding type-curve correlation equation (92), as shown in FIG. 12.

The hypothetical cumulative injection (91) has no physical meaning for a well pair that did not exist prior to the change. The value is simply a reference point to move along the type-curve correlation equation (92) for future production. Only incremental injection and production from the time of the change are physically meaningful. This may be addressed in the following order: obtaining cumulative well-pair production by moving along the type-curve correlation equations, calculating well-pair rates, summing up well-pair rates to well rates, and then calculating cumulative production from a production well. For a miscible flood, hypothetical water injection for the base waterflood and hypothetical solvent injection for the EOR contribution are calculated independently.

Once the hypothetical cumulative injection is determined for each well pair, the calculation goes back to the routine type-curve correlation equation scale-up until the next changes to wells and process parameters.

Semi-Automated History Match

Embodiments of this invention may alternatively include a semi-automated history-match process (80) that aims at speedy matching of predicted production with actual field data on a well basis. The predicted oil, gas, and water production can be adjusted by a semi-automated history match process. The history-matched model is then used for forward prediction.

The history-match process is illustrated by the 1000-well case described earlier. The field has more than 1000 wells under $CO_2$ WAG injection in the middle of the field and under waterflooding at the peripheral of the field. Following the pre-processing steps described in FIG. 3, ten sets of type-curve correlation equation parameters were developed for the $CO_2$ project area and six sets were for the waterflood area. In fact, it was determined later that sixteen sets were more than necessary for matching the field production. The field went through primary production and waterflooding before $CO_2$ WAG injection was implemented in 1984.

The full-field main model was initialized at the start of $CO_2$ injection in 1984. Beginning waterflood displaceable oil saturation $S_{WDO,0}$ equals waterflood displaceable oil saturation at the end of 1983 $S_{WDO,1983}$. Beginning waterflood displaceable oil saturation $S_{EDO,0}$ equals initial waterflood displaceable oil saturation $S_{EDOI}$. $S_{WDO,1983}$ is estimated in two stages: at the end of primary production in 1971 and at the end of waterflooding in 1983. In the first stage, $S_{WDO,1971}$=0.92 $S_{WDOI}$, to account for 8% original oil in place (OOIP) recovery from primary production. The second stage relies on simple single-phase tracer flow simulation, mimicking peripheral water injection/waterflooding from 1972 to 1983. This single-phase simulation requires input of yearly well locations and processing rates and input of $S_{WDO,1971}$ as the initial concentrations of a resident tracer. $S_{WDO,1983}$ is estimated by adjusting final tracer concentrations with one uniform factor for the entire field to satisfy the WDO material balance.

Production of oil, $CO_2$, lean gas, and water was matched from 1984 to 2000 for each of 600+ producers in the field, using a semi-automated process in the following steps.

Step 1: The best set of type-curve correlation equation parameters is assigned for each well pair by producer, based on the performance of the producer to which it is connected. This means all well pairs connected to the same producer has the same type-curve correlation equation assignment. Step 1 involves conducting a simulation run with the same set of type-curve correlation equations assigned to all producers without any adjustments to the history match parameters. This process is repeated for each of the available sets of type-curve correlation equations. Compared calculated production to actual for each producer, the best fitting set of type-curve correlation equations is then assigned to all well pairs connecting to the producer. This is referred earlier as the history match approach for type-curve correlation equation assignment.

After such type-curve correlation equation assignment, a simulation run was conducted to gauge the quality of matching predictions versus the field data. About 17% of the producers have good matches requiring little adjustments to the assigned type-curve correlation equation parameters. About 80% of the producers require moderate adjustments. About 3% of the producers have poor matches requiring significant adjustments. The poor matches are mostly related to the lack of high permeability channel characterization in the geological model.

Step 2: Gross adjustments to the type-curve history-match parameters are automated through a computer program. The step is illustrated using oil as an example. For each producer, one constant oil history-match parameter is calculated by dividing actual cumulative production in 2000 with predicted production in 2000. The calculation is automated for all producers using a separate computer program. Then, the main model is run again implementing the newly calculated oil history-match parameters. The process may be repeated. Matches were significantly improved after two rounds of adjustments. The same steps may be applied to $CO_2$, lean gas, and water production.

Step 3: Fine adjustments of the type-curve history-match parameters are achieved manually. The adjustment involves fine-tuning of the history-match parameters for each producer. Each of the history-match parameters is allowed to vary only once between 1984 and 1995 with no change allowed after 1995. It takes 3–4 model runs to achieve good matches for each of the producers in the field.

Figure 13:
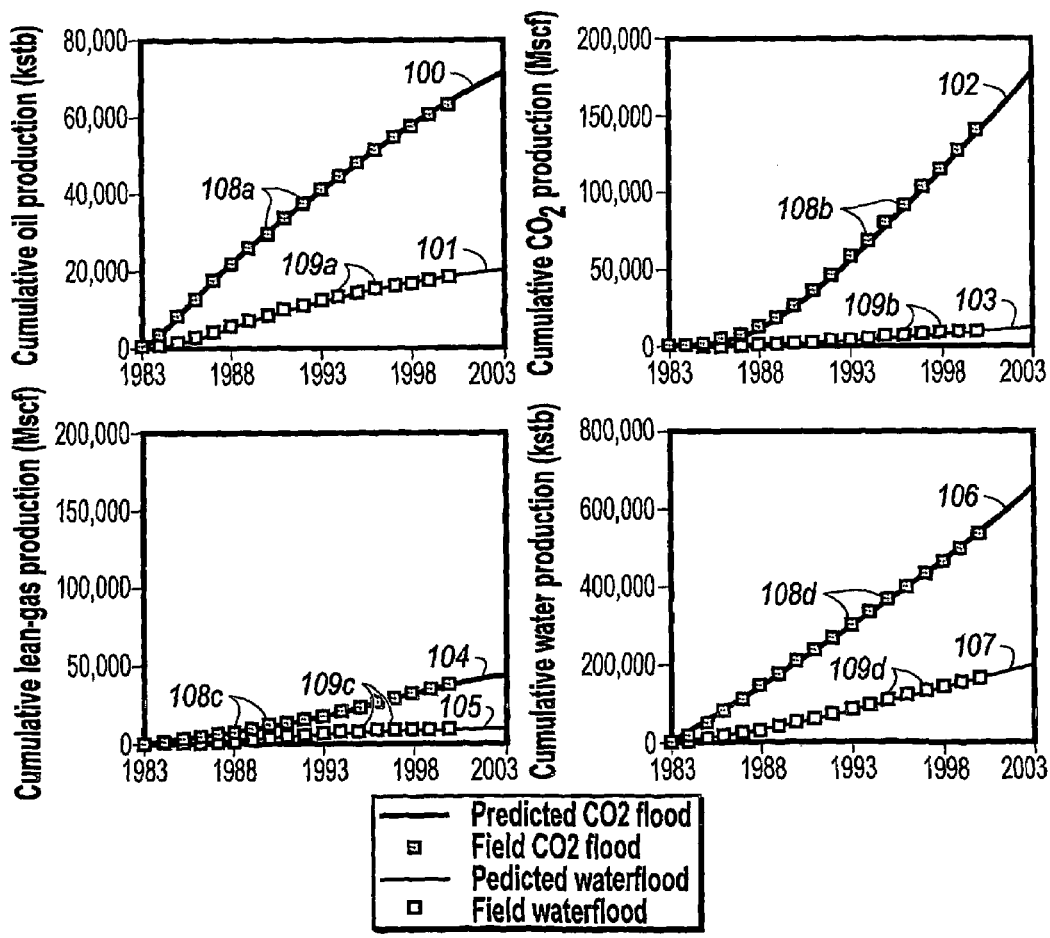
FIG. 13 illustrates the matching of predicted production with historical data for the $CO_2$ injection project area in the 1000-well pattern flood.
Figure 14:
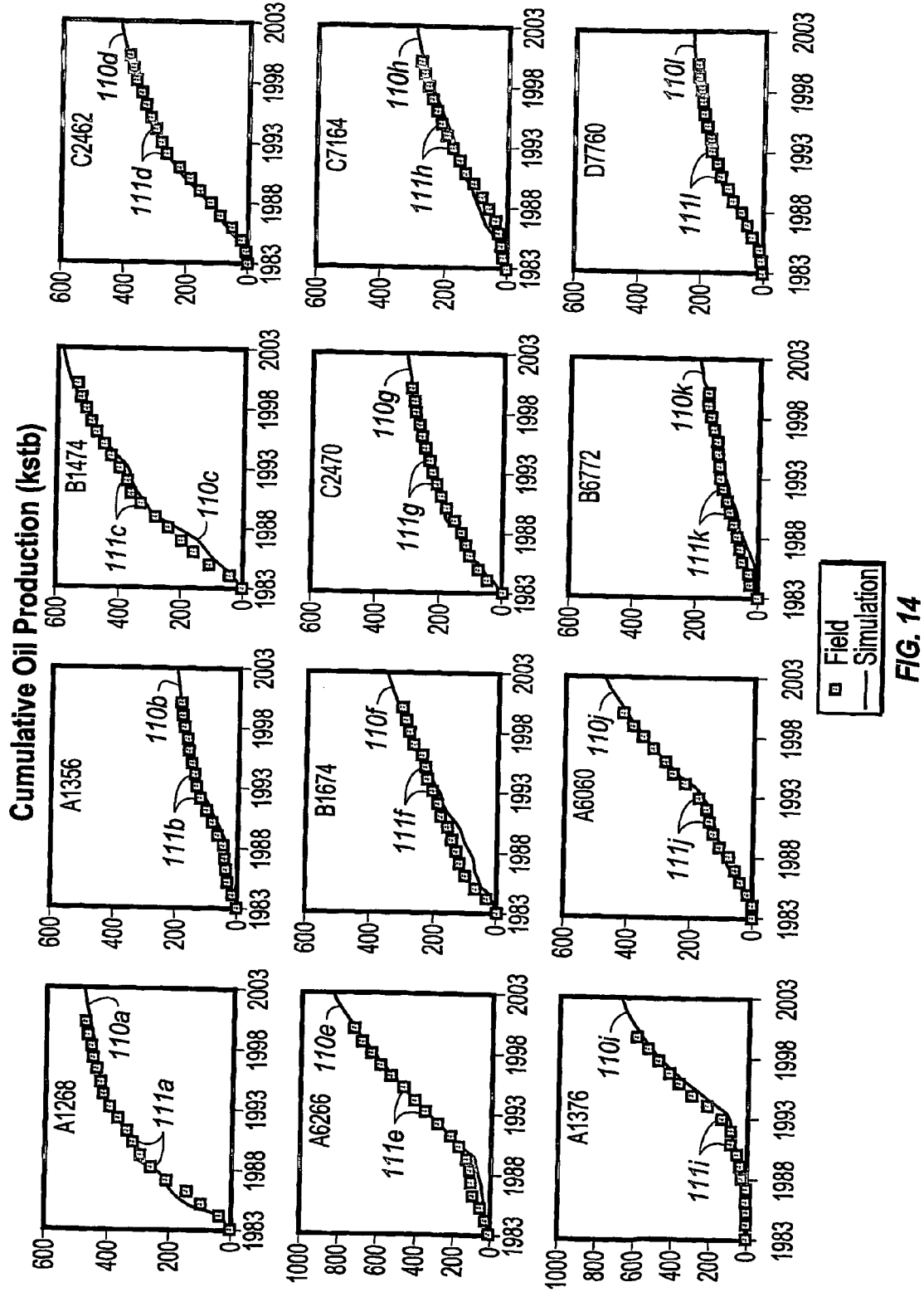
FIG. 14 illustrates the matching of predicted production with historical data for 12 of the 600+ production wells from the 1000-well patterned flood.
Figure 15:
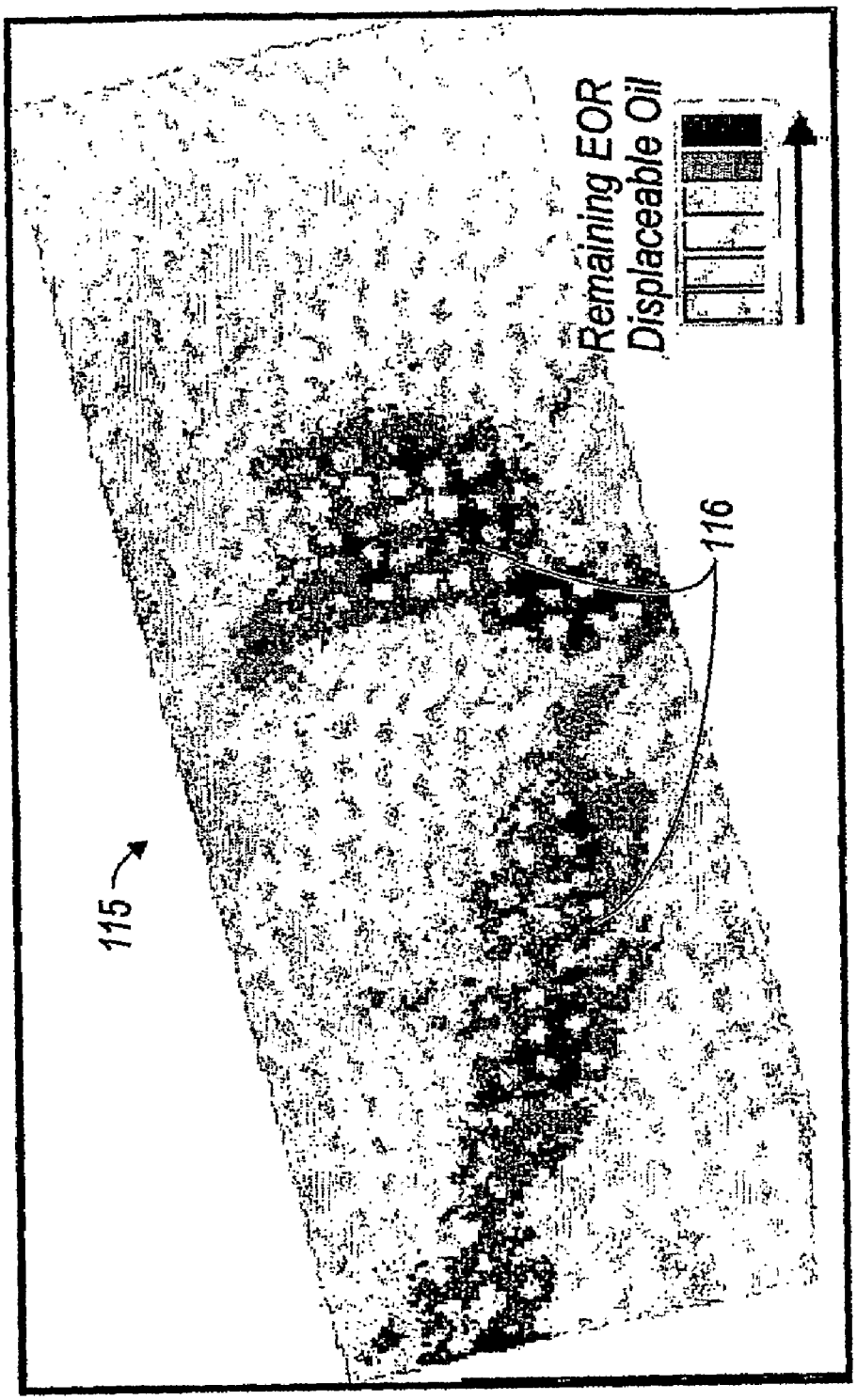
FIG. 15 illustrates the remaining EOR displaceable oil, after history matching, from the 1000-well pattern flood.

FIG. 13 shows predicted production (oil for $CO_2$ flood (100), oil for water flood (101), $CO_2$ for $CO_2$ flood (102), $CO_2$ for water flood (103), lean-gas for $CO_2$ flood (104), lean-gas for water flood (105), water for $CO_2$ flood (106), and water for water flood (107)) versus field data for the $CO_2$ project (108*a*, 108*b*, 108*c* and 108*d*) and waterflood project (109*a*, 109*b*, 109*c*, and 109*d*). FIG. 14 shows predicted cumulative oil production (110*a*-1) versus field data (111*a*-1) for 12 out of 600+ producers. The oil-tracking scheme for $S_{WDO}$ and $S_{EDO}$ was activated once per year. FIG. 15 shows the distribution of remaining EOR displaceable oil (115) after history matching, indicating some oil bypassed (116) by the injected miscible solvent.

The history-match model was then used to make forward predictions for new infill wells, $CO_2$ re-allocation, well shut-in, and $CO_2$ project expansion.

One detailed example of one embodiment of the invention is described below in a stepwise or logical format. This embodiment of the invention includes a method for predicting the performance of a patterned flooding process in a subterranean hydrocarbon-bearing formation, the formation being penetrated by a plurality of injection wells and production wells, including the steps of:

1) determining flow-based pairs connecting from an injection well to a production well based on stream lines generated from a single phase, 3-D, full-field flow model;
2) developing a connective pore volume distribution curve for each well pair;
3) selecting at least two, preferably three well pairs that reflect narrow, wide, and channel connective pore volume distributions that correspond to high, medium, and low oil recovery levels;
4) developing a 3-D, 3-phase, element-model simulation model for each selected well pair;
5) performing 3-D, 3-phase, element-model, finite-difference simulation for each well pair using various flooding types such as for waterflooding, miscible gas flooding, and post waterflooding, and using various process parameters such as rates, WAG ratios, and solvent bank sizes;
6) employing the above simulation results to generate sets of prototype performance curves for oil, water, and gas production for each well pair based;
7) expressing prototype performance curves in terms of type-curve correlation equations, as dimensionless oil, gas, and water production versus cumulative injection;
8) extracting correlation parameters by fitting the type-curve correlation equations with the prototype performance curves;
9) constructing a single-phase model for the entire field or at least a portion of the subterranean formation, with a 2-D geological model, injection and production well locations, well processing rates, indicators for water flooding, WAG injection, or post water flooding after WAG injection, miscible process parameters such as WAG ratios, solvent bank size, one tracer tracking saturation of recoverable oil from water flooding in model grid cells, and a second tracer tracking saturation of additional recoverable oil from miscible gas flooding;
10) initializing the model for pressure and saturations of recoverable oils from waterflooding and miscible gas flooding at the start of the calculation;
11) determining injector-producer pairs, each having a boundary that confines the flow from the injector to producer, based on streamlines generated from single-phase flow calculation;
12) determining the processing rate and pore volume for each injector-producer pair;
13) assigning a particular set of the prototype performance curves and associated type-curve correlation equations, parameters, and multipliers to each of the injector-producer pairs, using the history match scheme if sufficient production history exists otherwise using the connected PV scheme;
14) calculating cumulative injection for each well pair using its processing rate, then calculating production of oil, water, and gas for each well pair following its assigned type-curve correlation equations, parameters, and multipliers;

15) following the next three steps only if, at a given time, changes occur to injector and producer rates and locations or to process parameters;
16) estimating saturations of the recoverable oil from waterflooding and miscible gas flooding in the model grid cells before the changes, using single-phase tracer simulation and the oil material balance;
17) re-determining injector-producer pairs;
18) calculating the remaining recoverable oils from waterflooding and miscible gas flooding for the new well pairs, estimating cumulative injection for each of the new injector-producer pairs, then calculating production of oil, water, and gas for each of the new injector-producer pairs;
19) repeating steps 16–18 as long as changes occur to wells and process parameters,
20) calculating production of oil, water, and gas from a producer by summing up production from associated injector-producer pairs;
21) summing production from producers for the entire field or interested region;
22) matching predicted production to actual field data through a semi-automated history match method for a large-scale pattern flood with a large number of wells; and
23) predicting future production based on the history-matched model.

Symbols $\alpha$—the well-pair area
$a_{pwo}$—the PWF oil type-curve parameter
$a_{pws}$—the PWF solvent type-curve parameters
$b_{lg}$—the EOR lean gas parameter
$B_o$—the oil formation volume factor in RB/STB
$B_w$—the water formation volume factor in RB/STB
$B_s$—the solvent formation volume factor (RB/SCF)
$bt_{go}$, $a_{go}$, and $d_{go}$—three EOR oil type-curve parameters
$bt_{gs}$, $a_{gs}$, $d_{gs}$, and $p_{gs}$—four EOR solvent parameters
$bt_{wo}$, $m_{wo}$, $a_{wo}$, $d_{wo}$, and $n$—five WF oil type-curve parameters
$C_{lg}$—the lean gas to oil ratio in SCF/STB
$C_{WDOTRC}$—the concentration of WDOTRC resident tracer
$C_{WDOTRC\text{-}0}$—the beginning concentration of WDOTRC resident tracer
$C_{EDOTRC}$—the concentration of EDOTRC resident tracer
$C_{EDOTRC\text{-}0}$—the beginning concentration of WDOTRC resident tracer
$f_{ago}$—the EOR oil multiplier
$f_{ags}$—the EOR solvent multiplier
$f_{hlg}$—the lean-gas history-match factor
$f_{hlg}$—the lean-gas history-match parameter
$f_{ho}$—the oil history-match parameter
$f_{hs}$—the solvent history-match parameter
$f_{hwt}$—the water history-match parameter for a miscible gasflood.
$f_{hww}$—the water history-match factor for a waterflood
$f_{WDO,wp}$—the ratio of remaining oil to remaining tracer within a well pair Symbols $I_{pw}$—the cumulative post water injection
$I_t$—the cumulative total injection
$I_w$—the cumulative water injection
$k_v$—the average vertical permeability within an injector-producer pair
$N_{gt}$—total cumulative gas production
$N_{lge}$—cumulative production of lean gas from the EOR contribution
$N_{lged}$—the dimensionless cumulative EOR lean gas production
$N_{lgt}$—total cumulative production of lean gas
$N_{lgw}$—cumulative production of lean gas from a waterflood
$N_{oe}$—cumulative oil production from the EOR contribution
$N_{oed}$—the dimensionless cumulative EOR oil production
$N_{ot}$—total cumulative oil production
$N_{ow}$—cumulative oil production from a waterflood
$N_{owd}$—the dimensionless cumulative oil production
$N'_{owd}(t_c)$—the hypothetical cumulative oil production at the time of change $t_c$
$N_s$—cumulative solvent production from the EOR contribution
$N_{sd}$—dimensionless cumulative solvent production
$N_{wt}$—total cumulative water production
$N_{ww}$—cumulative water production from a waterflood
PV—the well-pair pore volume
$Q_t$—the total injection rate into an injector-producer pair
$R_{WAG}$—the WAG ratio
$R_{WAGB}$—the base WAG ratio
$S_{oi}$—the original oil saturation
$S_{orm}$—miscible-flood residual oil saturation
$S_{orw}$—waterflood residual oil saturation
$S_{EDO}$—EOR displaceable oil saturation
$S_{EDOI}$—original EOR displaceable oil saturation
$S_{EDO,0}$—EOR displaceable oil saturation at the start of type-curve scale-up Symbols $S_{WDO}$—waterflood displaceable oil saturation
$S_{WDOI}$—original waterflood displaceable oil saturation
$S_{WDO,0}$—waterflood displaceable oil saturation at the start of type-curve scale-up
$t_c$—the time when changes occurred to wells and/or processes
$x_{pw}$—the dimensionless post water injection
$x_s$—the dimensionless cumulative solvent injection
$x_{sf}$—the final solvent bank size
$x_w$—the dimensionless cumulative water injection
$\Delta\rho$—the density difference between gas and water
$\lambda_{g,cone}$—the gas mobility in the gas/water mixing zone
$\lambda_{w,cone}$—the water mobility in the gas/water mixing The present invention has been described in connection with its preferred embodiments. However, to the extent that the foregoing description is specific to a particular embodiment or a particular use of the invention, this is intended to be illustrative only and is not to be construed as limiting the scope of the invention. On the contrary, it is intended to cover all alternatives, modifications, and equivalents that are included within the spirit and scope of the invention, as defined by the appended claims.

What is claimed is:

1. A method for predicting performance of a patterned flooding process in a subterranean hydrocarbon-bearing formation, said formation being penetrated by a plurality of injector wells and producer wells, comprising the steps of:
  determining flow-based pairs of injector to producer wells (first well pairs) using a geological model;
  developing a connective pore volume distribution curve for each first well pair;
  selecting at least two first well pairs (selected well pairs) that reflect narrow and wide connective pore volume distributions that correspond to higher and lower oil recovery levels;

developing a 3-D simulation model for each selected well pair;

performing a reservoir simulation for each selected well pair for the corresponding flooding process; and generating prototype performance curves for each selected well pair.

2. The method of claim 1, wherein said selecting well pairs includes selecting at least three well pairs that reflect narrow, wide and channel connective pore volume distributions that correspond to high, medium, and low oil recovery levels.

3. The method of claim 2, wherein said corresponding flooding process is selected from waterflooding, enhanced oil recovery flooding, and combinations thereof.

4. The method of claim 3, wherein said enhanced oil recovery flooding process is selected from polymer flooding, surfactant flooding, steam flooding, emulsion flooding, and combinations thereof.

5. The method of claim 3, wherein said performing a reservoir simulation includes inputting process parameters selected from injection rate, production rate, WAG ratio, solvent bank size and combinations thereof.

6. The method of claim 2, wherein said 3-D simulation model is a 3-D, multi-phase, element model.

7. The method of claim 2, wherein said geological model is a 3-D full-field geological model.

8. The method of claim 2, wherein said prototype performance curves are selected from oil production curves, injectant production curves and lean gas production curves.

9. The method of claim 2 further comprising the step of expressing the prototype performance curves as dimensionless type-curve correlation equations having correlation parameters.

10. The method of claim 9, wherein said type-curve correlation equations are expressed as oil production versus cumulative injection, lean gas production versus cumulative injection, injectant production versus cumulative injection or combinations thereof.

11. The method of claim 9, further comprising determining a set of type-curve correlation equation multipliers, said type-curve multipliers functioning to adjust said type-curve correlation equations for variations in process parameters.

12. The method of claim 11, wherein at least one of said process parameters is selected from injection rate, VGR, WAG ratio, injectant bank size and combinations thereof.

13. The method of claim 1, wherein said injector wells are hypothetical injector wells, said hypothetical injector wells representing natural drive forces.

14. The method of claim 13, wherein said hypothetical injector wells represent natural water drive or natural gas drive.

15. The method of claim 11 further comprising the steps of:

providing a single-phase, 2-D model of at least a portion of the subterranean formation;

initializing said single-phase, 2-D model for initial pressure and initial oil saturation at the start of the patterned flooding process;

determining flow-based pairs of injector to producer wells (second well pairs) using said single-phase, 2-D model of at least a portion of the hydrocarbon-bearing formation;

determining for each second well pair a second processing rate and a second pore volume;

assigning to each second well pair one set of said type-curve correlation equations, said correlation parameters, and said type-curve multipliers;

calculating cumulative injection for each second well pair using said second processing rate and said second pore volume; and calculating cumulative fluid production for each said second well pair from said second well pair's assigned said type-curve correlation equations, said correlation parameters, and said type-curve multipliers.

16. The method of claim 15, wherein said determining flow-based well pairs includes using a single-phase flow calculation to generate streamlines and determine flow boundaries.

17. The method of claim 15, wherein said assigning to each said second well pair one set of said type-curve correlation equations, said correlation parameters, and said type-curve multipliers includes a method selected from history matching and connected pore volume distribution analysis.

18. The method of claim 15, wherein said calculating cumulative fluid production includes calculating oil production, lean gas production, injectant production, or combinations thereof.

19. The method of claim 17, further including calculating the total production from a first production well by summing cumulative fluid production for each said second well pair connected to said first production well and comparing said calculated total production from said first production well with actual field data for said first production well and matching said calculated total production from said first production well to said actual field data using a semi-automated history match method.

20. The method of claim 15, wherein at least one of injection well location, production well location, a process parameter, or a well processing rate is modified, the method further comprising the steps of:

estimating a second oil saturation in the single phase, 2-D model grid cells based on a tracer simulation representative of the formation before said modification;

making said modification;

re-determining flow-based pairs of injector to producer wells (third well pairs) using the single phase, 2-D model of at least a portion of the hydrocarbon-bearing formation and re-calculating for each third well pair a third processing rate and third pore volume;

re-assigning one set of said type-curve correlation equations, said correlation parameters and said type-curve multipliers to each said third well pairs;

calculating a new starting point on said type-curve correlation equations using said initial oil saturation and said second oil saturation; and using said third processing rate, said third pore volume, said type-curve correlation equations, said correlation parameters, and said type-curve multipliers to predict fluid production for each said third well pair for predetermined time intervals.

21. The method of claim 20, wherein said tracer simulation includes:

initializing a tracer at the start of the patterned flooding process;

determining a tracer concentration gradient in said single phase, 2-D model grid cells;

determining tracer production for each said second well pair before said modification;

determining oil production for each said second well pair before said modification;

determining the ratio of said oil production to said tracer production for each said second well pair before said modification; and determining said oil saturation before said modification in said single phase, 2-D model grid cells by multiplying said ratio by said tracer concentration gradient in said single phase, 2-D model grid cells for each of said second well pairs.

22. The method of claim 20, wherein said calculating a new starting point on said type-curve correlation equations includes:
calculating hypothetical oil production for each said third well pair;
extrapolating cumulative injection based on said assigned type-curve correlation equations, said correlation parameters, and said type-curve multipliers; and
using said cumulative injection as said starting point on said type-curve correlation equations.

23. A method for predicting performance of a patterned flooding process in a subterranean hydrocarbon-bearing formation, said formation being penetrated by a plurality of injector wells and producer wells, comprising the steps of:
generating type-curve correlation equations for two or more well types;
providing a single-phase, 2-D model of at least a portion of the subterranean formation;
initializing said single-phase, 2-D model for initial pressure and initial oil saturation at the start of the patterned flooding process;
determining flow-based pairs of injector to producer wells (second well pairs) using said single-phase, 2-D model of at least a portion of the hydrocarbon-bearing formation;
determining for each second well pair a second processing rate and second pore volume;
assigning to each second well pair one set of said type-curve correlation equations;
calculating second cumulative injection for each second well pair using said second well pair's second processing rate and second pore volume;
calculating second cumulative fluid production for each said second well pair from said second well pair's assigned type-curve correlation equations;
estimating a second oil saturation in the single phase, 2-D model grid cells based on a tracer simulation representative of the formation before a modification;
modifying injection well location, production well location, a process parameter, or a well processing rate;
re-determining flow-based pairs of injector to producer wells (third well pairs) using said single phase, 2-D model of at least a portion of the hydrocarbon-bearing formation and re-calculating for each said third well pair a third processing rate and third pore volume;
calculating a new starting point on said type-curve correlation equations using said initial oil saturation and said second oil saturation; and
using said third processing rate, said third pore volume, and said type-curve correlation equations to predict fluid production for each said third well pair for predetermined time intervals.

24. The method of claim 23, wherein said generating type-curve correlation equations includes generating at least three sets of type-curve correlation equations for three well types that reflect narrow, wide and channel connective pore volume distributions that correspond to high, medium, and low oil recovery levels.

25. The method of claim 24, wherein said type-curve correlation equations are dimensionless and include type-curve correlation parameters.

26. The method of claim 25, wherein said type-curve correlation equations are expressed as oil production versus cumulative injection, lean gas production versus cumulative injection, injectant production versus cumulative injection or combinations thereof.

27. The method of claim 25, further comprising determining a set of type-curve correlation equation multipliers, said type-curve multipliers functioning to adjust said type-curve correlation equations for variations in process parameters.

28. The method of claim 27, wherein at least one of said process parameters is selected from injection rate, VGR, WAG ratio, injectant bank size and combinations thereof.

29. The method of claim 27, wherein said determining flow-based well pairs includes using a single-phase flow calculation to generate streamlines and determine flow boundaries.

30. The method of claim 27, wherein said calculating second cumulative fluid production includes calculating oil production, lean gas production, injectant production, or combinations thereof.

31. The method of claim 27, wherein said tracer simulation includes:
initializing a tracer at the start of the patterned flooding process;
determining a tracer concentration gradient in said single phase, 2-D model grid cells;
determining tracer production for each said second well pair before said modification;
determining oil production for each said second well pair before said modification;
determining the ratio of said oil production to said tracer production for each said second well pair before said modification; and
determining said oil saturation before said modification in said single phase, 2-D model grid cells by multiplying said ratio by said tracer concentration gradient in said single phase, 2-D model grid cells for each of said second well pairs.

32. The method of claim 25, wherein said calculating a new starting point on said type-curve correlation equations includes:
calculating hypothetical oil production for each said third well pair;
extrapolating cumulative injection based on said assigned type-curve correlation equations, said correlation parameters, and said type-curve multipliers; and
using said cumulative injection as said starting point on said type-curve correlation equations.

* * * * *